United States Patent [19]

Tyburski et al.

[11] Patent Number: 4,912,471

[45] Date of Patent: Mar. 27, 1990

[54] INTERROGATOR-RESPONDER COMMUNICATION SYSTEM

[75] Inventors: Robert M. Tyburski, Fairfax, Va.; Robert W. Shillady, North Wales, Pa.

[73] Assignee: Mitron Systems Corporation, Columbia, Md.

[21] Appl. No.: 548,316

[22] Filed: Nov. 3, 1983

[51] Int. Cl.$^4$ .................. G01S 13/76; G01S 13/80; G01S 13/86

[52] U.S. Cl. ...................................... 342/42; 342/44; 342/51; 455/41; 455/49; 455/54; 340/505; 340/825.54; 340/825.55; 340/825.83; 340/825.86; 340/935; 340/941

[58] Field of Search .................... 343/6.5 SS, 6.5 LC, 343/6.5 R, 6.8 R, 6.8 LC; 364/424, 424.01, 424.03, 424.04, 424.05, 424.11–426.05; 455/41, 49, 54; 342/42–45, 50, 51; 340/47, 52 R, 52 F, 298, 311.1, 505, 696, 825.44, 825.54, 825.55, 825.83, 825.86, 933, 935, 938, 941, 988, 989; 246/7, 8, 13, 29 R, 30, 44, 62, 63 R, 11 R, 122 R, 124, 169 D, 178, 187 R, 193, 194

[56] References Cited

U.S. PATENT DOCUMENTS

| | | | |
|---|---|---|---|
| 3,090,042 | 5/1963 | Kleist et al. | 343/6.5 R |
| 3,270,338 | 8/1966 | Watters | 343/6.5 R |
| 3,713,148 | 1/1973 | Cardullo et al. | 343/6.5 R |
| 3,839,717 | 10/1974 | Paul | 343/6.5 LC |
| 3,859,624 | 1/1975 | Kriofsky et al. | 340/941 |
| 3,927,389 | 12/1975 | Neeloff | 364/424 X |
| 3,944,928 | 3/1976 | Augenblick | 340/825.54 |
| 3,984,835 | 10/1976 | Kaplan et al. | 343/6.5 SS |
| 4,038,653 | 7/1977 | Brewster | 343/6.5 SS |
| 4,075,632 | 2/1978 | Baldwin et al. | 343/6.8 R |
| 4,114,151 | 9/1978 | Denne et al. | 343/6.8 R |
| 4,159,531 | 6/1979 | McGrath | 364/424 X |
| 4,242,661 | 12/1980 | Henoch | 343/6.5 SS X |
| 4,313,118 | 1/1982 | Calvin | 343/5 PD |
| 4,390,880 | 6/1983 | Henoch | 343/6.8 LC |
| 4,550,444 | 10/1985 | Uebel | 455/41 |

FOREIGN PATENT DOCUMENTS

| | | | |
|---|---|---|---|
| 2926806 | 1/1981 | Fed. Rep. of Germany | 343/6.5 R |
| 2260115 | 8/1975 | France | 343/6.5 SS |
| 0138447 | 8/1982 | Japan | 364/424 |
| 5927278 | 2/1983 | Japan | 343/6.5 R |
| 0189467 | 10/1984 | Japan | 364/424 |
| 2103408 | 2/1983 | United Kingdom | 343/42 |

OTHER PUBLICATIONS

P. Lorrain et al., *EM Fields and Waves;* Appendix A, (1970).

R. Graf, *Dict. of Electronics;* p. 386, (1974).

J. Lenk, *Handbook of Microprocessors, Microcomputers and Minicomputers;* p. 51 (1979).

*Encyclo. of Science and Technology;* vol. 8, pp. 644–647 (1982).

"Short-Range Radio-Telemetry for Electronic Identification Using Modulated RF Backscatter", by A. Koelle et al. (Proc. of IEEE, 8/75; pp. 1260-1261).

"IBM Technical Disclosure Bulletin", (vol. 20, No. 7; 12/77), pp. 2525-2526.

"IEEE Transactions on Vehicular Technology", (vol. VT-26, No. 1), 2/77; p. 35.

*Primary Examiner*—Thomas H. Tarcza
*Assistant Examiner*—Bernarr Earl Gregory
*Attorney, Agent, or Firm*—Jim Zegeer

[57] ABSTRACT

An interrogator-responder communication system in which responders are carried by vehicles (such as railroad vehicles) travelling along a route and in which an interrogating station situated along the route operates each passing responder to recall data from a memory in the passing responder. In one embodiment, the responder is equipped to receive data transmitted from a transmit station and to store the received data, for later recall, in a non-volatile, electrically erasable read/write memory.

71 Claims, 11 Drawing Sheets

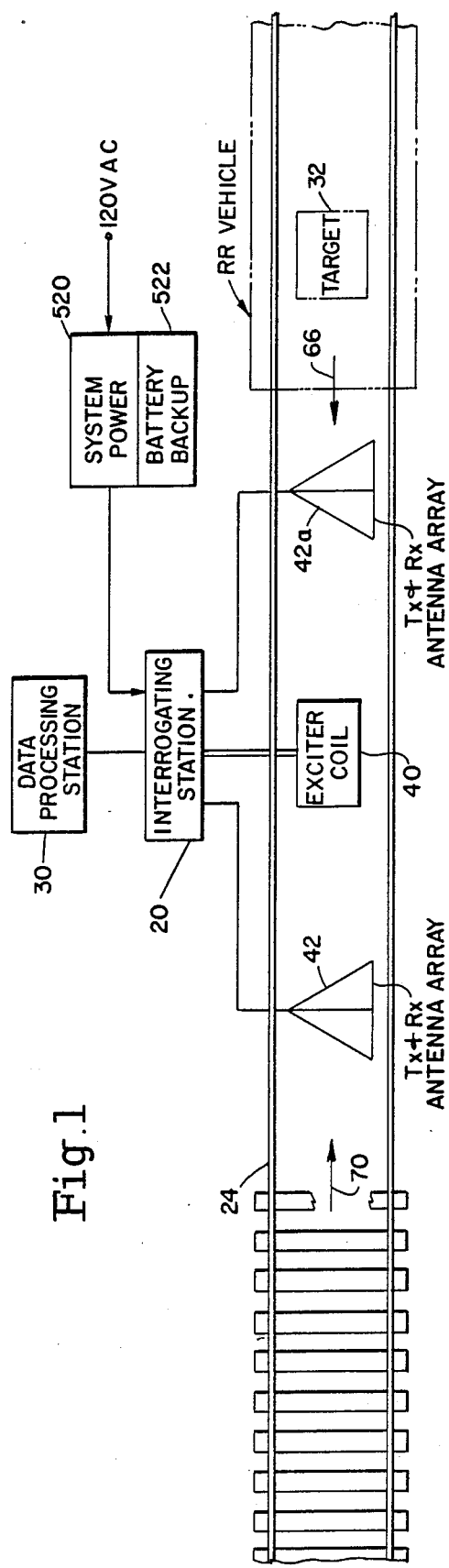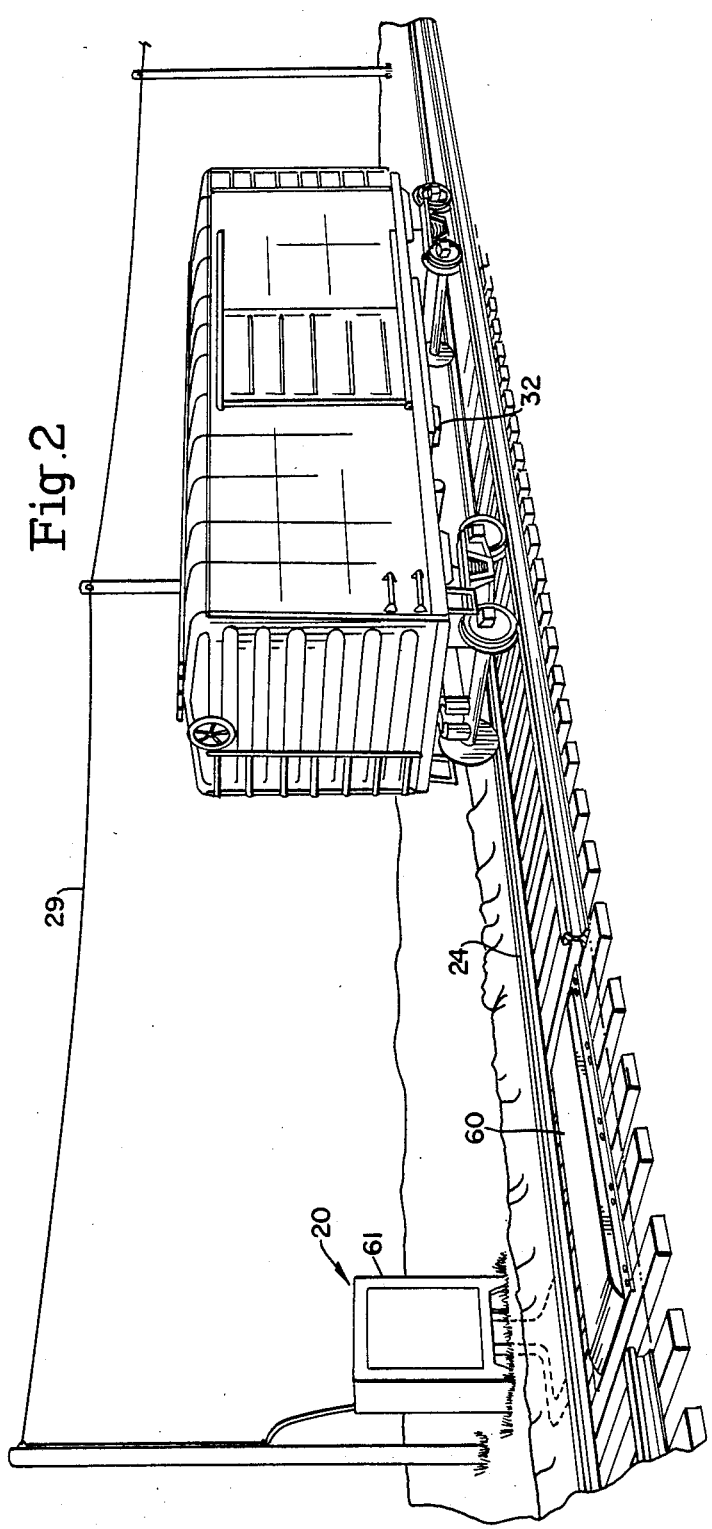

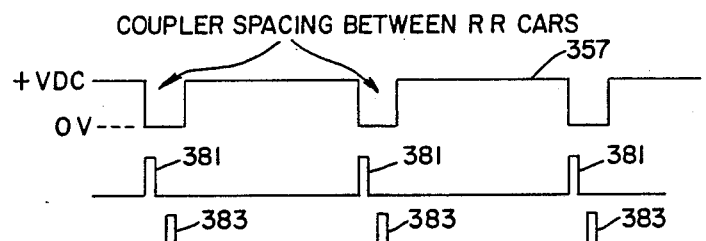
Fig.10
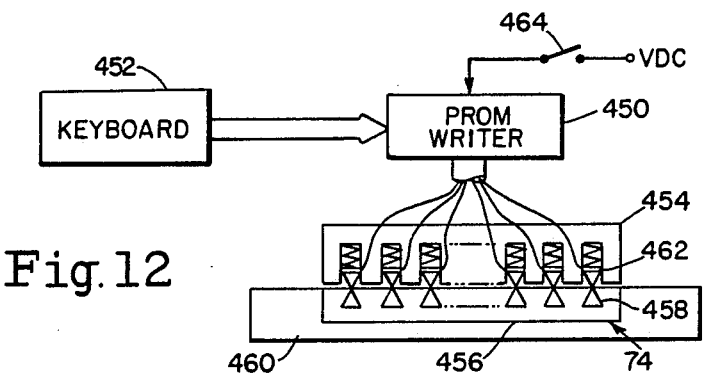
Fig.12
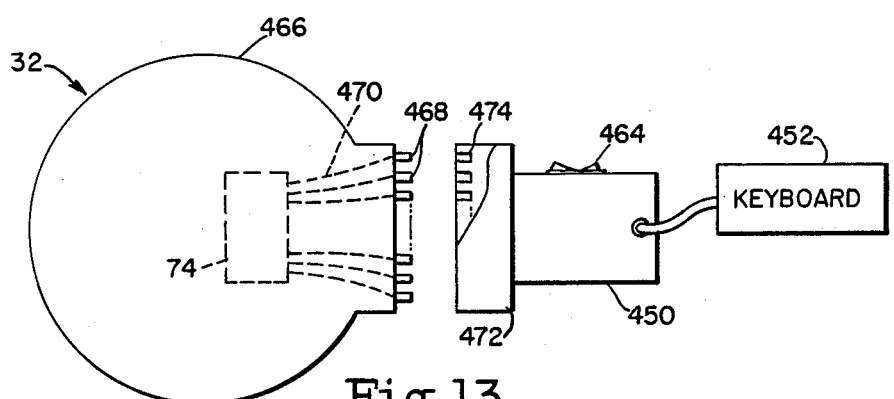
Fig.13
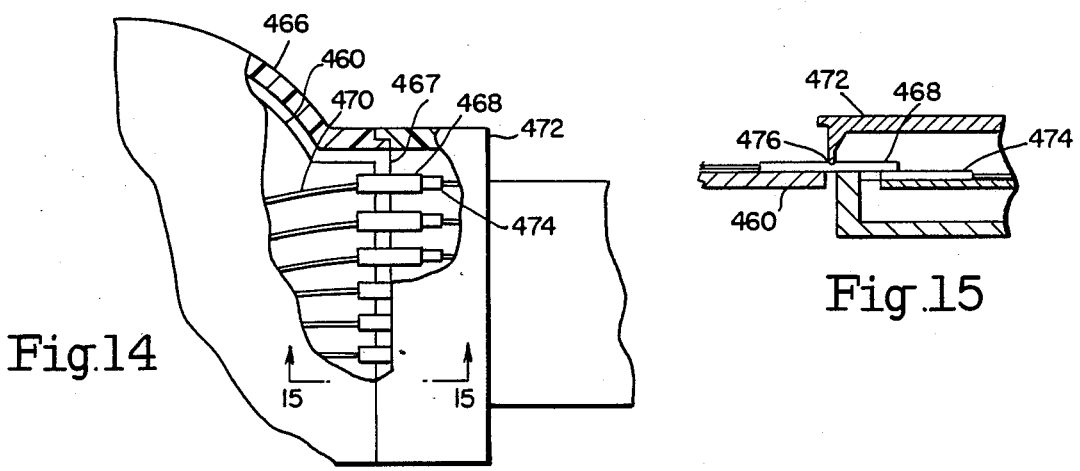
Fig.14
Fig.15

INTERROGATOR-RESPONDER COMMUNICATION SYSTEM

FIELD OF INVENTION

This invention relates to interrogator-type radio communication systems for monitoring the movement of railroad cars and other vehicles and is particularly concerned with a novel communication system in which electronically stored data is retrieved from a signal-responding device on the moving vehicle to identify the vehicle as it passes a wayside interrogating station. In accordance with an important aspect of this invention the signal-responding device may be used as a mobile data base which is capable of writing data into its memory as well as reading out the stored data. Because of this unique feature the vehicle-mounted signal-responding device of this invention can be used to store selected input data, such as waybill information.

DEFINITIONS

The term "target" is used herein to identify those devices which reflect or bounce back microwave or other radio frequency signals which are radiated through space. A radio transmitter, on the other hand, generates its own radio frequency signal from an internal power source.

The terms "signal-responding device" and "responder" are considered to be generic to targets and transmitters. Both of these terms are used herein to designate devices which are in some way triggered or otherwise rendered operative to send or release a message such as an identifying code or other data. As used herein, a responder or a signal-responding device may therefore be either a target or a transmitter.

Railroad cars (including cabooses, freight cars, tank cars and subway cars) and railroad locomotives or engines are collectively referred to herein as railroad vehicles.

"Data" and "Information" are used herein as equivalent terms.

Reference to various signals as being "transmitted" is considered to encompass reflected signals (as from the target of this invention) as well as signals generated by transmitters.

BACKGROUND

Efficient management and use of railroad freight cars require up-to-date information on the location of the railroad vehicles while they are i transit. Millions of dollars have therefore been spent on programs for monitoring the locations of freight cars in this and other countries.

The location monitoring programs commonly used over the years rely on visual sightings by individuals stationed at key sites and on data extracted from bills of lading and other freight documents. Such programs for keeping track of railroad freight cars are inefficient and unreliable. Furthermore, they are not designed to keep track of locomotives and cabooses.

As a result, numerous railroad cars and locomotives are often lost in the sense that the railroad vehicle owners and shippers are not certain where their railroad vehicles are at any particular time. Considerable time and money are therefore expended in tracing misplaced railroad cars and locomotives and attending to other problems arising from inadequate data on the locations of railroad vehicles. To a lesser extent the same or similar problems arise in the use of motor vehicle fleets such as trailer trucks.

In an effort to overcome the forgoing problem, various automatic car identification systems have been proposed for monitoring the locations of vehicles. Such systems typically employ responders which are carried by the vehicles and which are operated by awayside interrogating station to convey a coded vehicle-identifying signal to the interrogating station. Representative teachings of this type of interrogating system are found in U.S. Pat. No. 3,090,042 which issued to R. A. Kleist et al. on May 14, 1963, U.S. Pat. No. 3,270,338 which issued to R. L. Waters on Aug. 30, 1966, U.S. Pat. No. 3,713,148 which issued to M. W. Cardullo on Jan. 23, 1973, U.S. Pat. No. 3,859,624 which issued to T. A. Kriofsky et al. on Jan. 7, 1975, U.S. Pat. No. 3,839,717 which issued to J. C. Paul on Oct. 1, 1974, U.S. Pat. No. 3,984,835 which issued to G. S. Kaplan et al. on Oct. 5, 1976, U.S. Pat. No. 4,075,332 which issued to H. A. Baldwin et al. on Feb. 21, 1978, U.S. Pat. No. 4,114,151 which issued to Phillip Denne, on Sept. 12, 1978, U.S. Pat. No. 4,390,880 which issued to B. Henoc on June 28, 1983 and an article entitled "Short-Range Radio-Telemetry For Electronic Identification, Using Modulated RF Backscatter" by Alfred Koelle et al., proceedings of IEEE, Aug., 1975, pages 1260–1261.

The systems disclosed in the foregoing patents and publication, as well as known commercially available car identification systems, have a common shortcoming in that they each fail to satisfy all of the basic requirements for practical use in identifying freight cars and other railroad vehicles. These requirements include:

1. A small, totally passive, low cost responder which is adapted to be mounted on a railroad vehicle and which does not require any local power-producing source of its own for operation;

2. An interrogation system which accurately and reliably identifies railroad vehicles travelling over a wide range of speed extending from very low speeds up to relatively high speeds of about 100 mph;

3. An interrogation system in which none of the signal emissions requires an FCC license or other FCC approval;

4. An interrogation system having a suitable interrogation range in which sufficient power is delivered to the passive responder to enable the responder to redundantly emit an identification code to the interrogation station;

5. Built-in equipment for selectively testing the operability of the interrogating station;

6. Interrogating station and responder equipment designed to reliably and efficiently operate over long time periods without maintenance under all expected hostile environments, such as high and low ambient temperatures, rain, ice, snow, mechanical vibration and shock and the presence of chemicals or other deleterious materials which are hauled by freight cars;

7. An interrogation system which is capable of optionally collecting and recording information other than vehicle identifications, such as the speed and direction of the moving railroad vehicle, and the time and date when the information was acquired;

8. An interrogation system which produces a "clean list," that is, one which results in the identification of all vehicles;

9. An interrogation system which senses defective targets and which additionally distinguishes defective targets from the presence of passing railroad vehicles which are not equipped with targets or other responders; and 10. A target which is capable of being encoded in the field and which is also capable of having its stored information verified in the field.

Another problem with shipping freight by railroad involves the physical handling of waybills. According to the present-day practice, the waybills are typically hand carried by the train conductors and must be transferred by yardmen to the appropriate conductor at switching yards between the origin and destination points of the shipments, thus consuming time and labor.

SUMMARY AND OBJECTS OF INVENTION

With the foregoing in mind, the general aim and purpose of this invention is to provide a novel communication system which overcomes the foregoing problems and which meets all of the foregoing requirements as well as others for identifying railroad cars, locomotives, or other vehicles.

Although the communication system of this invention is particularly applicable for use with railroad vehicles, it may be used in a variety of other applications. For example, it may be used for motor vehicles.

In carrying out the invention for a railroad application, each freight car and/or other railroad vehicle in the system is equipped with a passive responder (or target, as it may be called) having an integrated circuit memory for electrically storing the vehicle's identification and/or other data such as information pertaining to the vehicle and, in the case of freight cars, information about the shipment being hauled by the car. In response to a signal from a wayside interrogating station, the target's stored information is recalled and transmitted to the interrogating station.

A particularly important feature of this invention resides in the concept of equipping the vehicle-mounted target with a memory of the non-volatile, electrically erasable, read/write type, whereby new data may be transmitted to the target and selectively written into the memory (and thus erasing old data previously stored in the memory), as well as reading stored data out of the target's memory for transmission to an interrogating station. Because of this feature, information, such as waybill information, may be transmitted to the target and written into the target memory at a shipment's origin point for later recall at the shipment's destination point, thereby eliminating the physical handling of waybill documents by train conductors ad yardmen. The target of this invention is capable of both storing new information and transmitting stored information on the fly, that is while the target-carrying vehicle is in motion, travelling along one route or another.

In one embodiment of this invention, the interrogating station is designed to transmit separate power and interrogation signals for reception by the target. The target is powered by the power signal to modulate the received interrogation signal with a vehicle identification code or other information. The thusly modulated interrogation signal is reflected by the target for return to and reception by the interrogation station.

The signal radiated by the interrogating station for powering the target is preferably a low frequency magnetic field which is coupled into the target as the target passes into the range of the interrogating station. The interrogating signal, on the other hand, is a low power, high frequency rf signal. By selecting a sufficiently low frequency for the power signal and sufficiently low power level for the interrogating signal, the need for an FCC operating license or other FCC approval is avoided.

According to another important feature of this invention, target operating power is conserved by designing the interrogating station to radiate an interrogating signal field at a location where it lies behind the station's power signal field as viewed from the direction of vehicle travel, and by designing the target's circuit in such a manner that it stores electrical energy as it passes through the power signal field, but does not use the stored energy to power its major circuits until it leaves the power signal field.

With this power-conserving feature, sufficient power is supplied to the target to enable it to repeatedly send its vehicle identification code and/or other data to the interrogating station as it passes through the trailing interrogating signal field even in situations where the railroad vehicle is travelling at a high speed. The repetitive transmission of the data is used by data processing equipment to accurately and reliably verify the vehicle's identification and/or other information recalled from the target's memory. By conserving the target's operating power in this manner, the power signal level can be kept relatively low to avoid problems attendant with high power levels without compromising the accuracy and reliability of the system.

According to another important feature of this invention, the interrogating station is advantageously equipped with two transceivers for monitoring vehicles travelling in either direction on a given route or track. Each transceiver transmits its own interrogating signal and receives the target-produced reflection of it transmitted interrogating signal. The disposition of the signal fields developed by this arrangement is such that the power signal field lies between the two interrogating signal fields along the path of vehicle travel.

Upon entering the leading interrogating signal field, the target will not respond because it is still unpowered. Upon entering of the trailing interrogating signal field, however, the target will be powered to respond to the transceiver which develops the trailing interrogating signal field. The target will therefore be interrogated for either direction of vehicle travel, and the direction of vehicle travel can be determined by identifying the transceiver which receives the target's response signal.

According to another important feature of this invention, the vehicle identification code or other data stored in the responder's memory s conveniently read out in the form of clocked NRZ (non-return to zero) signals which are converted by the target into bi-phase digital signals. The bi-phase signals are modulated onto an rf subcarrier which in turn is used to modulate the incoming interrogating signal. With this modulation process, a side frequency of the reflected interrogating signal will be modulated with the target's digital information.

The unique bi-phase/subcarrier modulation process outlined above is used with a novel signal processor in the interrogating station to generate the NRZ clock signal, which is required for processing the received data.

According to another important feature of this invention, the data transmission system is designed to sense the presence of defective targets and to distinguish a defective target from a railroad car or other vehicle having notarget at all as well as other disturbances in the interrogating signal field.

According to yet another important feature of this invention, the interrogating station is equipped with a self-test circuit for selectively testing the operability of the interrogating station and to thereby determine if it is in proper working order.

In view of the foregoing, other important and related objects of this invention reside in the provision of:

1. A novel vehicle identification communication system requiring no FCC license or other FCC approval;
2. A unique target or other responder for receiving a data-bearing signal and having an electrically erasable read/write memory for storing the received data for later recall;
3. A unique system for controlling the supply of power in the target;
4. A unique target for modulating an interrogating signal with a vehicle identification code and/or other information;
5. A unique interrogating station receiver and signal processor for recovering an NRZ clock and NRZ data;
6. A unique system for sensing the presence of defective vehicle-mounted targets and for distinguishing defective targets from railroad cars or other vehicles which are not equipped with signal-responding targets;
7. A unique interrogating station which has a selective self-test capability;
8. A unique system for sensing the direction of railroad car movement;
9. A unique system for reliably and accurately identifying railroad cars and other vehicles travelling over a wide range of speeds extending from relatively low speeds up to high speeds on the order of 100 miles per hour;
10. A unique system for producing a "clean list" of railroad vehicle identifications; and
11. A unique, low cost, totally passive vehicle target capable of withstanding all expected hostile environments.

Further objects of this invention will appear as the description proceeds in connection with the below-described drawings and the appended claims.

DESCRIPTION OF DRAWINGS

FIG. 1 is a generally schematic plan view of a railroad interrogator system incorporating one embodiment of this invention;

FIG. 2 is a perspective view of the system shown in FIG. 1 and illustrating a target-mounting freight car passing the interrogating station shown in FIG. 1;

FIG. 10 is a waveform diagram illustrating various signals occurring in operation of the circuit shown in FIG. 9;

FIG. 12 is a partially schematic diagram illustrating one embodiment of a field encoder for encoding the PROM (Programmable Read Only Memory) in the target shown in the previous Figures;

FIG. 13 is a partially schematic plan view of a field encodable target and another embodiment of a field encoder for encoding the memory in the target;

FIG. 14 is an enlarged fragmentary view of the target and field encoder shown in FIG. 13 with portions of the casings for the target and encoder broken away to illustrate interior details;

FIG. 15 is a section taken substantially along lines 15—15 of FIG. 14;

DETAILED DESCRIPTION

In the illustrated embodiment the principles of this invention are incorporated into a railroad vehicle identification system for monitoring the locations of railroad cars, locomotives and other railroad vehicles while they are in transit. The system typically comprises several interrogating stations which are spaced at key locations in a railroad network. For simplicity, only one interrogating station (indicated at 20) is illustrated in FIGS. 1 and 2 and is located to monitor passing railroad vehicles travelling along a set of tracks 24. A communication link 29 transmits vehicle identification and/or other information from the interrogating station to a data processing station 30. Station 30 may comprise a computer for processing the incoming data.

Each railroad vehicle to be identified and monitored is equipped with a target 32 which may be mounted on the vehicle as shown in FIG. 2. Instead of mounting target 32 on the moving vehicle, it will be appreciated that for certain applications, target 32 may be located along a route while the interrogating station itself is carried by the moving vehicle. Target 32 is of the passive type having no power producing source of its own.

Figure 3:
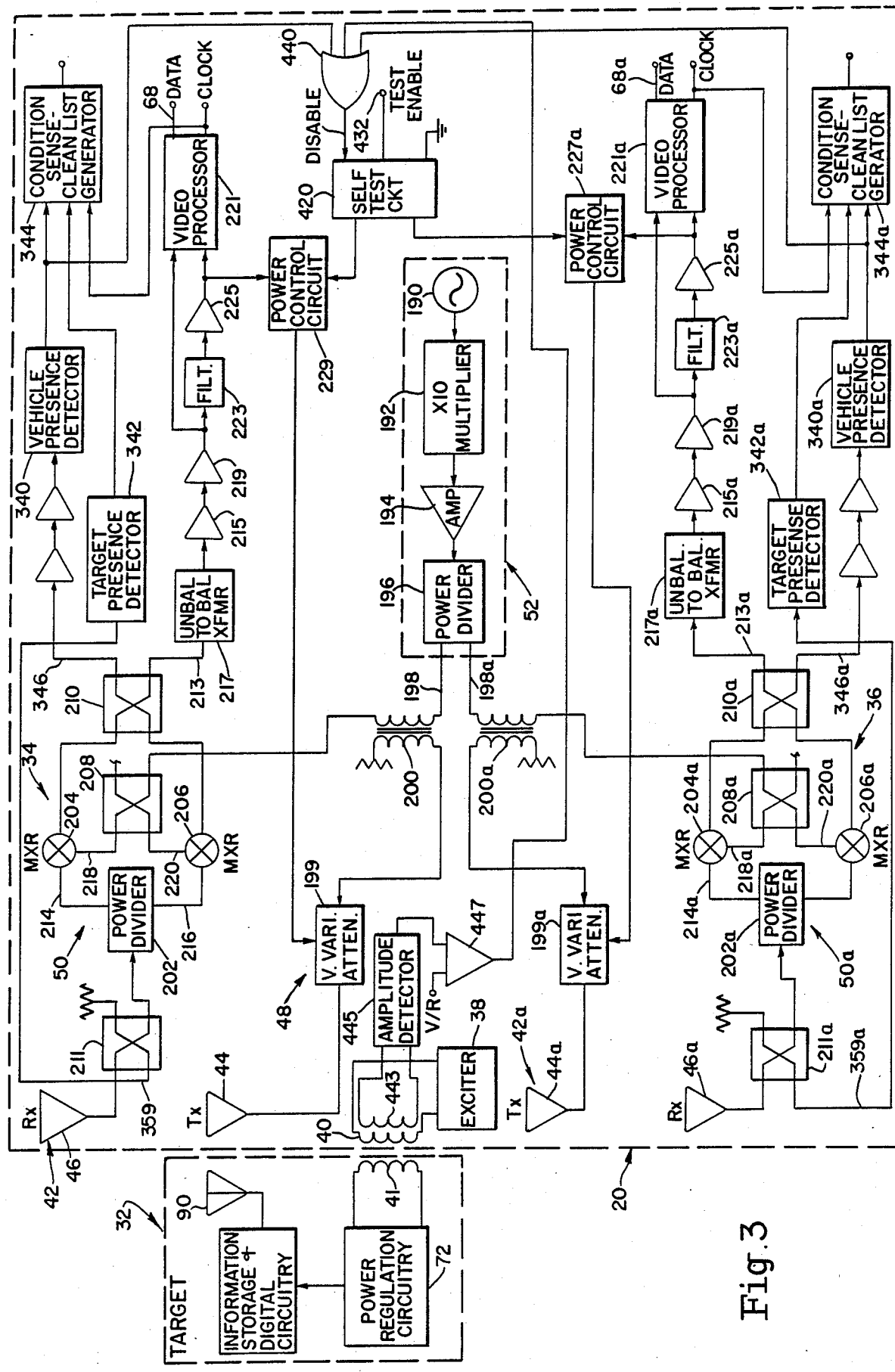
FIG. 3 is a schematic block diagram of the interrogating station and target shown in FIG. 2.

As shown in FIG. 3, interrogating station 20 comprises a pair of transmitter-receiver interrogating units 34 and 36, and a single exciter 38 which is connected to an exciter coil 40 for generating a low frequency magnetic power field. Upon movement of target 32 into the exciter field, coil 40 inductively couples with a coil 41 in target 32 to transfer all of the power required for operating the target. The frequency of the exciter's magnetic field or power signal, as it may also be called, may be any suitable, relatively low value such as 25 kHz. The two transmitter-receiver units 34 and 36 are used to establish two interrogating channels for sensing the direction of railroad vehicle travel in a manner to be described in greater detail later on. They also permit railroad vehicles to be monitored regardless of their direction of travel along the track.

The interrogating station's transmitter-receiver unit 34 comprises an antenna array 42 having separate transmit and receive antennas 44 and 46. Transmit antenna 44 forms a part of a transmitter 48 in unit 34. Receive antenna 46 forms a part of receiver 50 in unit 34.

The transmitter-receiver unit 36 is of the same design as unit 34. Accordingly, like reference numerals have been applied to identify like components of the two units except that the reference numerals used for unit 36 have been suffixed by the letter "a" to distinguish them from the reference numerals use for unit 34.

A suitable rf signal source 52 is common to transmitters 48 and 48a and is coupled to transmit antennas 44 and 44a for radiating a pair of low level, electromagnetic microwave interrogating signals. The interrogating signals are received and reflected by target 32 as the target passes over antenna arrays 42 and 42a. The common frequency of the two interrogating signals may be 915 mHz. It will be appreciated that other frequencies may be selected.

Antenna array 42 and 42a and exciting coil 40 are preferably housed in a radome-like casing or cover 60, (see FIG. 2) for protecting the antennas and the exciting coil against the environment. Casing 60 is positioned between the railroad tracks as shown in FIG. 2. Any suitable wayside cabinet 61 may be used to house and protect the interrogating station's circuits.

As shown in FIG. 1, antenna arrays 42 and 42a are spaced apart along the path of travel of the vehicle-mounted target 32. Exciter coil 40 is positioned between antenna arrays 42 and 42a.

The electromagnetic fields radiated by antennas 44 and 44a are spaced apart along tracks 24 and are non-overlapping above a preselected db level. Below this preselected level, the interrogation signals are sufficiently weak that they will not effectively be sensed by target 32. The exciter field developed by exciter 38 lies between the two interrogating signal fields. The exciter field may overlap the two interrogating signal fields to some extent. It is preferred, however, that the fields be developed in such a way that the exciter field does not overlap the interrogating signal fields. The peak levels of the two interrogating signal fields and the exciter field are spaced apart along the track.

For a railroad vehicle moving in the direction of arrow 66 in FIG. 1, target 32 will first pass through the interrogating signal field that is radiated by antenna 44a. At this point, target 32 remains inoperative because it has not entered the power signal's exciter field and therefore has no operating power for modulating the interrogating signal which is transmitted by antenna 44a.

After passing over antenna array 42a, target 32 passes over exciter coil 40 to receive and store power. Upon entering the trailing interrogating signal field, target 32 will therefore be powered to modulate the interrogating signal which is transmitted by antenna 44. the reflected or re-radiated response of target 32 is strong enough to be received by receiver 50 for developing an output signal at the receiver's data output terminal 68 (FIG. 3). The strength of this reflected signal, however, is insufficient to provide adequate reception at antenna 46a for developing an output signal at the data output terminal 68a in unit 36. The output at terminal 68, but not terminal 68a therefore indicates that the railroad car is travelling in the direction of arrow 66.

For a railroad car travelling in the opposite direction (as indicated by the arrow 70 in FIG. 1), target 32 first passes through the electromagnetic field radiated by antenna 44 before reaching the power signal's exciter field. Being unpowered at this stage, target 32 will not modulate the interrogating signal which is transmitted by transmitter 48 and reflected back to receiver 50. As a result, no data output signal will appear at the data output terminal 68 in unit 34. As target 32 passes over exciter coil 40, it will receive operating power, so that when it reaches the interrogating signal field radiated by antenna 44a, it will have power for modulating the interrogating signal which is transmitted from antenna 44a. The modulated interrogating signal is reflected by target 32 for reception by receiver 50a to develop a digital signal at the data output terminal 68a in unit 36, thus serving to indicate that the railroad car is travelling in the direction of arrow 70.

The transmitting and receiving antennas 44 and 46 may be of any suitable type. For example, the transmitting antenna 44 may be a simple dipole spaced quarter wavelength above the ground plane. The receiving antenna 46 may also be of the dipole type having directors for increasing its gain. Antennas 44 and 46 may be arranged adjacent to one another. The transmitting and receiving antennas 44a and 46a may be of the same type as that described for antennas 44 and 46 respectively.

The requirement for an FCC license to radiate the 915 mHz±13 mHz rf signals is avoided by keeping the power level of the radiated signals below 50 microvolts per meter as measured at 30 meters from the transmit antenna. For signal frequencies below 450 kHz, the signal may be transmitted at any power level without requiring an FCC license under current FCC regulations. Accordingly, no FCC license is needed for the 25 kHz power signal regardless of its power level. Target 32 emits no signals other than re-radiating the low power interrogating signals. Therefore, none of the signal emissions in the system requires an FCC license or other FCC approval.

Figure 4:
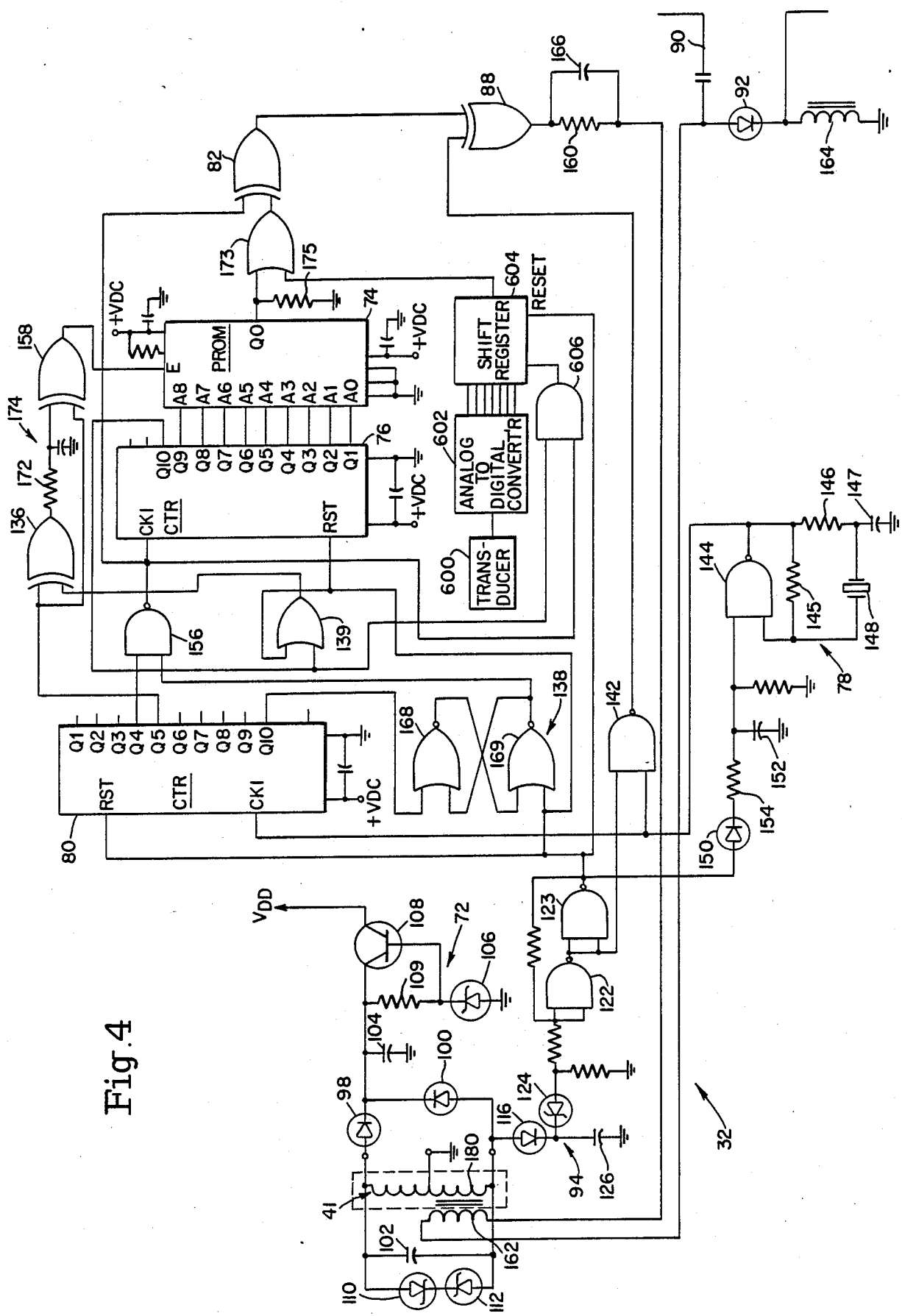
FIG. 4 is a schematic circuit diagram of the target shown in FIG. 2.

In the embodiment shown in FIG. 4, target 32 mainly comprises a power supply and regulation circuit 72 for converting the incoming 25 kHz power signal into d.c. for powering the target's circuit, which includes a programmable read only memory (PROM) 74 for storing the vehicle identification and any other data to be returned to interrogating station 20, an address counter 76 for addressing the different bit storage locations in memory 74, a free-running oscillator 8 which is preferably of the crystal type for developing a subcarrier signal 79 (see FIG. 5) of suitable, preselected frequency such as 1 mHz, a 12 bit counter 80 for dividing the 1 mHz oscillator subcarrier signal to develop a clock or timing signal for clocking out the binary data stored in memory 74, an exclusive OR gate 82 which takes the NRZ binary digital signal (indicated at 84 in FIG. 5) from memory 74 and converts it into a bi-phase digital signal 86 (see FIG. 5), another exclusive OR gate 88 for phase modulating the 1 mHZ subcarrier oscillator signal 78 with the bi-phase digital signal 86, an antenna 90 for receiving and reflecting or re-radiating each 915 mHz interrogating signal, an antenna-terminating, PIN diode 92 which is used to amplitude modulate the received interrogating signal with the modulated 1 mHz subcarrier signal, and a field presence detector and reset circuit 94 which keeps the target's timing and modulating circuits from consuming power while target 32 is travelling through the interrogating station's exciter field. Use of the bi-phase signal 86 provides a self-synchronizing system to eliminate the need for transmitting a separate clock signal from the target in addition to the data-bearing signal.

Power supply circuit 72 may be of any suitable circuit design and is shown in FIG. 4 to comprise pickup coil 41, a pair of rectifying diodes 98 and 100, a pair of capacitors 102 and 104, a zener diode 106 and a transistor 108.

Coil 41 inductively couples with exciter coil 40 to receive the interrogating station's 25 kHz power signal. Capacitor 102 is connected across pickup coil 41 to resonate the coil at the 25 kHz excitation frequency. Diodes 98 and 100 are connected in the manner shown to provide full wave rectification of the received 25 kHz exciting signal, and the rectified current charges capacitor 104 to supply power to a simple series voltage regulator comprising zener diode 106, transistor 108 and a resistor 109. The series regulator circuit delivers a constant d.c. operating voltage which is taken from transistor 108 and applied to power all of the target's circuits.

In a situation where the railroad car stops at a position where target 32 lies in the interrogating station's exciter field it was found that the voltage across pickup coil 41 could rise to an excessively high level to cause damage to the target. To avoid this undesirable condition, a pair of zener diodes 110 and 112 are connected anode to anode and in series across pickup coil 41 to limit the voltage excursion across the pickup coil to a safe, preselected value such as 15 volts.

To conserve power, the field detector and reset circuit 94 operates to inhibit counters 76 and 80 and also to inhibit the application of the 1 mHz subcarrier signal to gate 88 while target 32 is traveling through the interrogating station's exciter field. To accomplish these functions, circuit 94 comprises a field-detecting diode 116, a pair of NAND gates 122 and 123, a zener diode 124, and a capacitor 126. Gates 122 and 123 are connected as inverters and are in series to form a current driver.

Still referring to FIG. 4, the field detecting diode 116 is connected to the target's pickup coil 41 to detect the received power signal which is inductively coupled into coil 41 by the interrogating station's exciter coil 40. The voltage at the anode of diode 116 rises to indicate the presence of the interrogating station's exciter field when current is induced in pickup coil 41 upon entry of target 32 into the exciter field.

The power signal current detected by diode 116 charges capacitor 126, which is relatively small so that it charges rapidly to the zener voltage of diode 124. When this happens the output of gate 122 goes negative, causing the output of gate 123 to go positive.

In the illustrated embodiment, the zener voltage of diode 124 is set at 11 volts so that the positive output of gate 123 will be at least 11 volts but no higher than 15 volts because of the 15 volt clamp which is established by diodes 110 and 112.

The output of gate 123 is connected to the reset terminals of counters 80 and 76, to one input of an RS flip flop 138, and through an OR gate 139 to one input of an exclusive 0 gate 136. The functions of gate 136 and flip flop 138 will be explained later on. The output of gate 122 is connected to one input of a NAND gate 142. Oscillator 78 is connected to the other input of gate 142, and the output of gate 142 is connected to one input of gate 88, which, as previously mentioned, is used to modulate the 1 mHz subcarrier 79 with the bi-phase digital signal 86.

With the foregoing circuit connections it will be appreciated that when diode 116 detects the presence of the interrogating station's exciter field to cause the output of gate 123 to rise to a positive voltage, counters 76 and 80 will be placed in their reset modes and gates 136 and 142 will be inhibited. In their reset modes, counters 76 and 80 will not consume any power even though d.c. operating voltage is applied at this time by power supply circuit 72. By inhibiting gate 142, the 1 mHz subcarrier will not be supplied to gate 86, thus preventing subcarrier current from being conducted through the antenna terminating diode 92 to dissipate power. The foregoing conditions will subsist as long as target 32 remains in the exciter field, thus conserving power throughout the travel of target 32 through the exciter field.

Oscillator 78 may be of any suitable free-running circuit design and is shown in FIG. 4 to comprise a pair of resistors 145 and 146, a capacitor 147 and a crystal 148, all connected in the manner shown.

When zener diode 124 is biased into conduction in response to the detection of the interrogating station's exciter field, diode 150 will be biased to conduct current. Current conducted by diode 150 enables a NAND gate 144. Gate 144 upon being enabled, supplies current to energize oscillator 78. Current conducted by diode 150 also charges a capacitor 152 through a resistor 154. The charge stored on capacitor 152 keeps gate 144 enabled after target 32 leaves the interrogating station's exciter field.

From the foregoing description it will be appreciated that oscillator 78 will be turned on shortly after target 32 enters the interrogating station's exciter field. By turning oscillator 78 on early, sufficient time is allowed for the oscillator's output signal to stabilize before target 32 reaches the trailing interrogating signal field.

Figure 5:
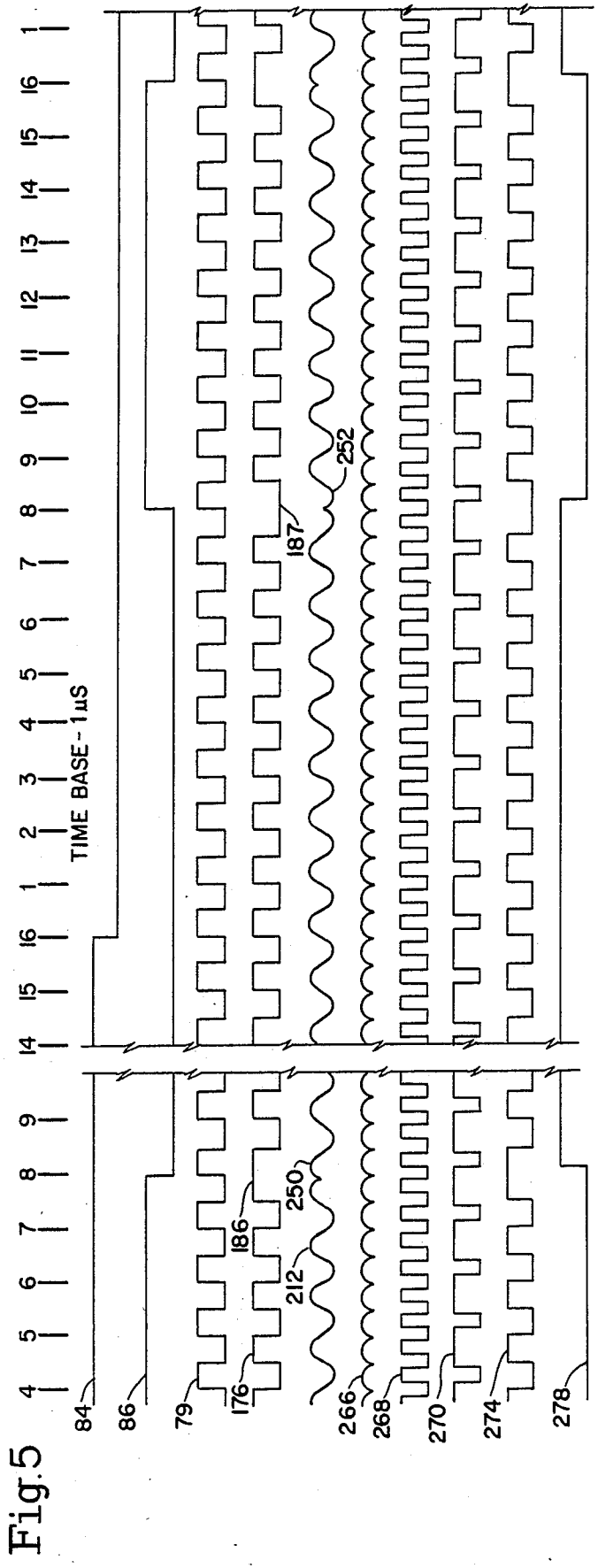
FIGS. 5 and 6 are waveform diagrams illustrating various signals in the interrogator-responder system.

Still referring to FIG. 4, the output of oscillator 78 is taken from gate 144 and, in addition to being applied to gate 142, it is also applied to the clock input of counter 80 to serve as the clock for counter 80. Upon switching out of its reset mode counter 80 will therefore be clocked or advanced at the constant, 1 mHz pulse rate of the oscillator subcarrier signal 79. The oscillator signal is a unipolar square wave as shown in FIG. 5.

The divide-by-sixteen output of counter 80 is applied through a NAND gate 156 to the clock input of counter 76. The pulse repetition frequency of this clock signal is 62.5 kHz. The $Q_1$–$Q_9$ outputs of counter 76 are connected in parallel to the A0–A8 address inputs of memory 74.

In addition to being connected to the clock input of counter 76, the output of gate 156 is connected to an input of gate 82. The data output of memory 74 is connected to the other input of gate 82 in FIG. 4. The $Q_5$ output of counter 80 is connected to an input of gate 136 and to an input of a further exclusive OR gate 158. The output of gate 136 is connected to the other input of gate 158, and the output of gate 158 is connected to the enable terminal of memory 74.

The output of gate 82 is connected to one input of gate 88. A current limiting resistor 160, an rf choke coil 162, terminating diode 92 and a further rf choke coil 164 are connected in series between the output of gate 88 and ground as shown. A pulse shaping capacitor 166 is connected in parallel with resistor 160 to improve fidelity of the modulating pulses which are fed by gate 86 to terminating diode 92. Coils 162 and 164 isolate the received interrogating signal from the digital circuitry in target 32.

Still referring to FIG. 4, flip flop 138 comprises a pair of NOR gates 168 and 169. The $Q_{10}$ output of counter 80 is connected to one input of gate 168, and gate 168 is connected to one input of gate 169. The output of flip flop 138 is connected to an input of gate 156 to control the gating of the 62.5 kHz pulse signal to the clock input of counter 76 and to gate 82.

From the foregoing description it is apparent that target 32 has no power producing source of its own. It therefore will remain inoperative until it enters the exciter field which is developed by the interrogating station's exciter coil 40. When target 32 enters the exciter field and as long as it remains in the exciter field, the output of gate 123 will be high at some positive voltage to hold counters 76 and 80 in their reset modes and to hold gate 142 in its inhibited state as previously explained. In addition, the positive output of gate 123 will keep flip flop 138 in its reset mode. In its reset mode, flip flop 138 holds gate 156 in its inhibited state. Thus, as long as target 32 is in the exciter field, counters 76 and 80 will remain inoperative so that no data is read out of memory 74. Additionally, no modulating current will be conducted through diode 92.

Upon leaving the interrogating station's exciter field, the a.c. voltage across pickup coil 41 will collapse. The output of the field presence detector diode 116 will therefore reduce to zero, terminating the input voltage to oscillator 78 and causing the output of gate 123 to switch to its zero volt or logic 0 state. The charge stored on capacitor 152 will now keep oscillator 78 energized as target 32 travels through the interrogating signal field lying behind the power supplying exciter field. The remaining circuits in target 32 will be powered by the charge stored on capacitor 104.

By switching the output of gate 123 to its zero voltage state in response to the departure of target 32 from the exciter field, counters 76 and 80 will be released from their reset modes. Counter 80 will therefore commence operation, counting the clock pulses which are supplied by oscillator 78. In addition, gate 142 will be enabled, thus applying the 1 mHz subcarrier signal to input of gate 86 for conduction through terminating diode 92.

Shortly after commencing operation of counter 80, the $Q_5$ output of counter 80 will come high. This logic state is applied to the input of gate 136, which together with gate 158 and an RC network 172 forms an enable circuit 174 which supplies a short enable pulse to the enable input of memory 74 in response to the rise of the $Q_5$ output of counter 8 to its high state.

The $Q_{10}$ output of counter 80 will come high to set flip flop 138 512 microseconds after counter 80 commences operation. Upon being set, flip flop 138 enables gate 156 to apply the 62.5 kHz clock signal to the clock input of counter 76 and to gate 82.

From the foregoing description it will be appreciated that gate 156 is enabled a short preselected time delay after enabling memory 74. The delayed enablement of gate 156 delays modulation of the 1 mHz subcarrier by 0.5 milliseconds. The unmodulated subcarrier will therefore be transmitted initially in unmodulated form to allow signal processing circuits (221, 221a) in station 20 to lock with the subcarrier before arrival of data, as will be described in detail later on. Flip flop 138 will remain in its set state to keep gate 156 enabled as long as target 32 remains powered by power supply circuit 72.

In response to application of 62.5 kHz clock signal, counter 76 sequentially addresses the different storage locations in memory 74 for reading out the stored binary information. Memory 74 typically stores a vehicle-identifying code which is unique to each target and hence unique to the railroad vehicle carrying the target. This code is used to identify the travelling railroad vehicle as it passes each interrogating station along its route. Additionally or alternatively, memory 74 may be used to store other data.

Counter 76 will recycle itself to thus recurrently read out the memory's stored data until all of the target's stored energy is expended. The various design parameters are such that sufficient charges are stored in capacitors 104 and 152 during the travel of target 32 through the interrogating station's exciter field for recurrently reading out the memory's stored data several times. The recurrent read-out of the stored data is radiated back to interrogating station 20 in the form of a modulating signal component. The reoccurring data is recovered by station 20 and is used in conventional data processing operations to enhance the accuracy of he recovered data. As many as 512 bits may be stored in memory 74 and read out in each cycle of counter 76.

The data bits stored in memory 74 are serially read out in the form of the conventional NRZ (non-return to zero) digital signal as indicated at 84 in FIG. 5. Signal 84 is conducted through an OR gate 173 (FIG. 4). The bit rate of signal 84 is set by the address counter clock rate, namely 62.5 kHz. The 62.5 kHz clock rate is fast enough to read out the entire 512 bit content of the memory three times for a target speed of 100 mph. A loading resistor 175 connected between the $Q_0$ data output of memory 74 and ground keeps the output from floating.

The NRZ data signal 84 and the 62.5 kHz clock signal are applied to gate 82 which converts the NRZ signal 84 into the bi-phase digital signal 86. The conversion process performed by gate 82 is such that a 1-0 represents a logic 1 and a 0-1 represents a logic 0 as shown in FIG. 5. For each binary bit read out of memory 74, the bi-phase signal 86 will therefore be high fifty percent of the bit's duty cycle and low fifty percent of the bit's duty cycle.

The bi-phase digital signal 86 at the output of gate 82 is applied to gate 88 to synchronously phase modulate the 1 mHz subcarrier signal 79 before it is applied to the antenna-terminating diode 92. The modulated 1 mHz subcarrier signal is indicated at 176 in FIG. 5.

Signal 166 is conducted by the antenna-terminating diode 92 to amplitude modulate the received interrogating signal from station 20. The modulation process is one of altering the impedance of diode 92 (which is the antenna load impedance) relative to the radiation resistance of antenna 90. Depending upon the antenna load, the incoming interrogating signal is either absorbed or re-radiated by antenna 90. Because of the digital pulse waveform of the 1 mHz subcarrier signal 79 the modulated 1 mHz subcarrier conducted by diode 92 will also be in digital form and will have only two states, one being positive and the other being essentially zero.

The higher 1 mHz current signal state is adjusted to provide the current-dependent impedance of diode 92 with a value that equals the antenna radiation resistance. The lower 1 mHz signal state (zero current) places diode 92 in its high impedance state.

When antenna 90 is terminated in its radiation resistance, all of the energy in its radiating aperture will be absorbed in the antenna load, namely diode 92. In this state there will be virtually no reflection or re-radiation of the interrogating signal.

In the alternate state, in which diode 92 is in its high impedance state, virtually no energy in the received interrogating signal is absorbed in diode 92. In this alternate state, virtually all of the energy in the transmitted interrogating signal will be reflected or re-radiated from antenna 90. Through this amplitude modulation process of the incident interrogating signal, the modulated 1 mHz subcarrier signal will appear as a side frequency of the reflected interrogating signal.

From the foregoing description, it will be appreciated that, upon leaving the exciter field and entering the trailing interrogating signal field, target 32 will modulate the received interrogating signal and will reflect or re-radiate the modulated interrogating signal. Antenna 90 will not transmit the modulated 1 mHz subcarrier signal by itself because it is not configured as a transmit antenna, and, instead, is configured just to receive the incoming interrogating signal and to reflect it, depending upon the impedance of the antenna-terminating diode 92. In the illustrated embodiment, antenna 90 is preferably of the slotted dipole type spaced at a fractional wave length above the ground plane. Preferably, antenna 90 is fabricated as a printed circuit which permits diode 92 to be of the glass-packaged type which is readily mounted at the antenna terminals along with choke coils 162 and 164.

As shown in FIG. 5, the 1 mHz signal 79 has a fifty percent duty cycle. The common pulse width will therefore be the same as the spacings or durations between positive going pulses in the 1 mHz signal. The coding or phase modulating process performed by gate 88 is such that a transition in bi-phase signal 86 from its high state to low state causes a phase inversion in the 1 mHz signal as illustrated in FIG. 5. For each bi-phase signal transition from the high state to the low state, the 1 mHz signal will therefore be provided with a single positive going pulse width or high state which is twice the normal pulse width of the unmodulated 1 mHz signal and which therefore is equal in duration to one cycle of the 1 mHz signal. The double pulse width is indicated at 186 in FIG. 5.

Each transition of bi-phase signal 86 from its low state to its high state also results in a phase inversion. In this instance, however, the 1 mHz signal will be provided with a negative going pulse width or pulse spacing which is twice the normal width and which therefore is equal to one cycle of the 1 mHz signal. The double negative going pulse is indicated at 187 in FIG. 5.

Because the bi-phase signal 86 is clocked at the 62.5 kHz rate and because the 1 mHz frequency is equal to the product of the 62.5 kHz rate and an integer (namely 16), the bi-phase signal will be synchronized with the 1 mHz oscillator signal in such a manner that the transitions in the bi-phase signal from low to high and high to low will occur simultaneously with the rising edges of positive going pulses in the 1 mHz signal. The bi-phase coding f data read out of memory 74 guarantees that for 50 percent of each cycle, the bi-phase signal 86 will be in its high state upon reception at the interrogating station, even though the digital modulation on the re-radiated signal changes phase as the target on the moving vehicle passes into and out of the interrogating signal's quarter wavelength zones. The unique modulation of the 1 mHz signal establishes the basis for generating a 62.5 kHz clock signal at interrogating station 20 without requiring transmission of a clock signal from target 32 to station 20. This clock generation process will be described later on.

From the foregoing description it will be noted that the unmodulated 1 mHz signal 79 is applied to diode 92 as soon as target 32 leaves the interrogating station's exciter field and approximately 0.5 milliseconds prior to read-out of data stored in memory 74. This delay is used at interrogating station 20 to recover the target's data without loss of data bits as will be explained in detail later on.

According to a further feature of this invention, choke coil 162 is inductively coupled with a half section 180 of pickup coil 41. By this coupling, the received 25 kHz power signal is applied to modulate or vary the impedance of the antenna-terminating diode 92. Modulation of the received 915 mHz interrogating signal with tee received 25 kHz power signal requires only a relatively few, reliable components in target 32. The components for accomplishing this modulation are pickup coil 41, choke coils 162 and 164, resistor 160 and diode 92. These components are highly reliable and are not likely to fail.

Thus, failure of any circuits or components other than the circuit used for modulating the incident or received interrogating signal with the received 25 kHz power signal will result in re-radiation of an interrogating signal which is modulated only by the 25 kHz power signal. Interrogating station 20 is designed to detect 25 kHz without data to thereby give an indication that the passing target is defective.

From the description thus far it is significant to note that the target's 1 mHz oscillator signal serves as the target's subcarrier signal and, in frequency divided form, as the 62.5 kHz clock signal for clocking the data bits out of memory 74.

From the foregoing description it also will be appreciated that oscillator 78 and the frequency-dividing counter 80 form a free-running clock signal source or generator for generating the 62.5 kHz clock signal. Being free-running, it is clear that this clock signal source is not slaved to and therefore operates a synchronously with respect to interrogating station 20.

As shown in FIG. 4, target 32 may optionally be quipped with one or more transducers or sensors for measuring or detecting one or more selected variables or conditions such as temperature, pressure, speed, distance, vibration, shock, stress, time, liquid level, presence and/or amount of liquid, chemicals, and radiation. One such sensor or transducer is indicated at 600 in FIG. 4 and is connected to an analog-to-digital converter 602. Converter 602 converts the analog, condition-indicating output signal of transducer 600 into a plural bit digital signal having a parallel bit format. The parallel bit output of converter 602 is converted into a serial bit digital NRZ signal by any suitable means such as a shift register 604. The serial bit digital signal at the output of register 604 is conducted through gate 173 to gate 82 where it is converted into a bi-phase digital signal similar to signal 86. This condition-indicating bi-phase signal is then modulated onto the 1 mHz subcarrier at gate 88, and the modified subcarrier is then applied to modulate the incoming interrogating signal for transmission back to station 20 in the manner previously described. Accordingly, the condition-indicating digital signal will be recovered at station 20, as will be explained in detail below.

The clock signal for register 604 is taken from the output of gate 156 and is applied to an AND gate 606. The $Q_{10}$ output of counter 76 is also applied to gate 606 as well as to gate 139. When gate 606 is enabled by the $Q_{10}$ output of counter 76, the cock signal is applied to register 604 to serially clock the data bits out of the register. The output of gate 123 is connected to the reset pin of register 604 so that register 604 will be reset when detector 116 senses the presence of the exciting field which is generated by the interrogating station's exciter coil 40.

Since gate 139 is connected to gate 136, memory 74 will be disabled when the $Q_{10}$ output of counter 76 comes high to inhibit further read-out of data from memory 74.

The $Q_{10}$ output counter 76 will come high following upon counting in the first 1024 clock pulses from counter 80. In this embodiment, 1024 clock pulses is twice the number of data bit storage locations in memory 74. Counter 76 will therefore address each of the memory's data bit storage locations twice, thus reading out the stored data twice, before the $Q_{10}$ output of counter 76 comes high to inhibit the data read-out.

Accordingly, for the first 1024 clock pulses of the 62.5 kHz clock, the $Q_{10}$ output of counter 76 will be low, permitting read-out data stored in memory 74. While the $Q_{10}$ output of counter 76 is low to permit the read-out of data in memory 74, gate 606 will be disabled, thus preventing the application of clock pulses to shift register 604 to clock data out of the shift register. Therefore, data in register 604 will not be read out while data is being read out from memory 74.

When the $Q_{10}$ output of counter 76 comes high, memory 74 will be disabled to inhibit further read-out of data and gate 606 will be enabled, thus permitting application of clock pulses to register 604 to clock out the data in the register. Therefore, while data in register 604 is being clocked out to gate 173, there will be no read-out of data stored in emory 74. The foregoing circuit operation thus precludes the simultaneous transmission of data stored in register 604 and memory 74.

Referring back to FIG. 3, the interrogation station's signal source 52 may be of any suitable circuit design and is shown to comprise a crystal oscillator 190, a frequency multiplier 192, an amplifier 194 and a power divider 196. Oscillator 190 supplies a 91.5 mHz signal to multiplier 192 which multiplies the oscillator signal by ten. The resulting 915 mHz interrogating signal is amplified by amplifier 194 and applied to power divider 196, which has a par of outputs 198 and 198a for simultaneously supplying the interrogating signal to antennas 44 and 44a.

The interrogating signal at output 198 is coupled to a voltage variable attenuator 199 by a coupler 200 and is fed from attenuator 199 to antenna 44. The interrogating signal at output 198a is similarly coupled to another voltage variable attenuator 199a by a coupler 200a and is fed from attenuator 199a to antenna 44a. The interrogating signal is therefore radiated simultaneously by antennas 44 and 44a to develop the two interrogating signal fields which are spaced apart along tracks 24. The interrogating station's 25 kHz exciter or power signal field lies between the two interrogating signal fields as previously explained.

Still referring to FIG. 3, receiver 50 is of the homodyne type and comprises a power divider 202, a pair of mixers 204 and 206, and a pair of quadrature couplers 208 and 210. This circuitry forms a down converter for recovering the target's 1 mHz subcarrier signal in the form of an IF output signal 212 (see FIG. 5). The reflected interrogating signal received at antenna 46 is fed through a quadrature coupler 211 to power divider 202 which has one output 214 for applying the received signal to mixer 204, and another output 216 for applying the received signal to mixer 206. An amplifier (not shown) may be included between antenna 46 and power divider 202 to amplify the received signal.

Signal source 52 is used to supply the local oscillator signal to mixers 204 and 206. In the illustrated embodiment this is accomplished by connecting the source's power divider output 198 to one input of quadrature coupler 208. Coupler 208 has two outputs 218 and 220, the former being connected to the local oscillator input of mixer 204, and the latter being connected to the local oscillator input of mixer 206. Quadrature coupler 208 may be of any suitable circuit design for establishing a 90° phase difference between the two local oscillator signals of equal amplitude at outputs 218 and 220. This may be accomplished by imparting a 90° phase shift to one of the coupler's output signals, but not the other.

Each of the mixers 204 and 206 mixes its local oscillator signal with the received interrogating signal to thereby downconvert the received interrogating signal frequency to the target's 1 mHz subcarrier frequency. Because of the 90° phase difference between the two local oscillator signals, the IF signal outputs of mixers 204 and 206 will also be 90° out of phase with respect to each other. The mixers' IF output signals are applied to separate inputs of quadrature coupler 210.

Coupler 210 may be any suitable lumped element circuit for establishing another 90° phase shift between the two IF signals and for summing the two IF signals after the phase shift to develop the receiver's 1 mHz IF signal 212, which is the recovered version of the target's modulated subcarrier signal 176. The dual mixer arrangement together with the two 90° phase shifting circuits is described in the previously identified Koelle publication and U.S. Pat. No. 4,075,632, which are incorporated by reference into this specification.

The phase difference between the received signal and the local oscillator signal at receiver 50 will vary because the distance between target 32 and the interrogating station's receive antenna varies as the travelling target passes over the interrogating station's antenna array. A phase difference of either 0° or 180° may therefore occur between the received signal and the local oscillator signal. In a conventional single-mixer homodyne receiver, the IF output amplitude would fall to zero with resultant loss of received data where a phase difference of 0° or 180° occurs between the received rf and local oscillator signals. With the dual mixer arrangement shown in FIG. 3, however, the IF outputs of mixers 204 and 206 cannot fall to zero at the same time because of the 90° phase shift which is introduced by coupler 208. Therefore, the IF output of one or the other of the mixers 204 and 206 will always be at some finite level at any given time. The dual mixer arrangement shown in FIG. 3 also prevents amplitude variations from occurring in the IF signal 212 due to range variations between target 20 and the interrogating station's receive antenna.

The bit rate of the data-bearing bi-phase signal is preferably set at 62.5 kHz or some other selected value which is much lower than the selected frequency of the subcarrier signal. The lower bit rate has the effect of reducing the bandwidth of the IF signal 212 to a value that does not exceed the passband of conventional circuit designs for the lumped sum quadrature coupler 210, thus permitting the use of such conventional circuit designs without distorting the IF signal. The reduced bit rate of the bi-phase signal also has the effect of avoiding signal distortion in the signal processor 221 as will be described in detail later on.

Still referring to FIG. 3, the received IF signal 212 at the coupler's output 213 is applied to a low-noise video amplifier 215 through an unbalanced-to-balanced transformer 217. Transformer 217 is so designed that it has a passband from 10 kHz to a frequency greater than 1 mHz. This passband eliminates the carrier noise which is developed by source 52 and by the motion of vehicles or other objects passing through the interrogating signal field. The IF signal at the output of amplifier 215 is applied to a buffer amplifier 219.

The IF signal at the output of amplifier 219 is applied to a 1 mHz bandpass filter 223 and also to an input of a signal processor or video processor (as it may also be called) 221. Filter 223 passes just the recovered 1 mHz subcarrier frequency, which is amplified by an amplifier 225 and applied to another input of processor 221. The 1 mHz signal at the output of amplifier 225 is also applied to a power control circuit 227 which develops a gain or power control signal for controlling the extent to which attenuator 199 attenuates the 915 mHz interrogating signal.

Following the downconversion and IF amplification process in receiver 50, the 1 mHz IF output signal 212 will have a sine wave configuration as shown in FIG. 5. The reduction from the square wave configuration of signal 176 to its sine wave configuration is due to the band limiting effects of amplifier 215.

Because of the foregoing change in configuration, the double width pulses 186 and 187 in the modulated subcarrier signal 176 will transform into dual-peaked alternations in the IF output signal 212 as shown in FIG. 5. The IF signal's dual-peaked alternation 250 results from the positive going pulse 186 and the IF signal's dual-peaked alternations 252 results from the negative going pulse. The frequency of the dual peaks is twice the 1 mHz IF frequency. These dual-peaked alternations are eliminated in signal processor 221 in the course of processing the IF signal 212.

Figure 7:
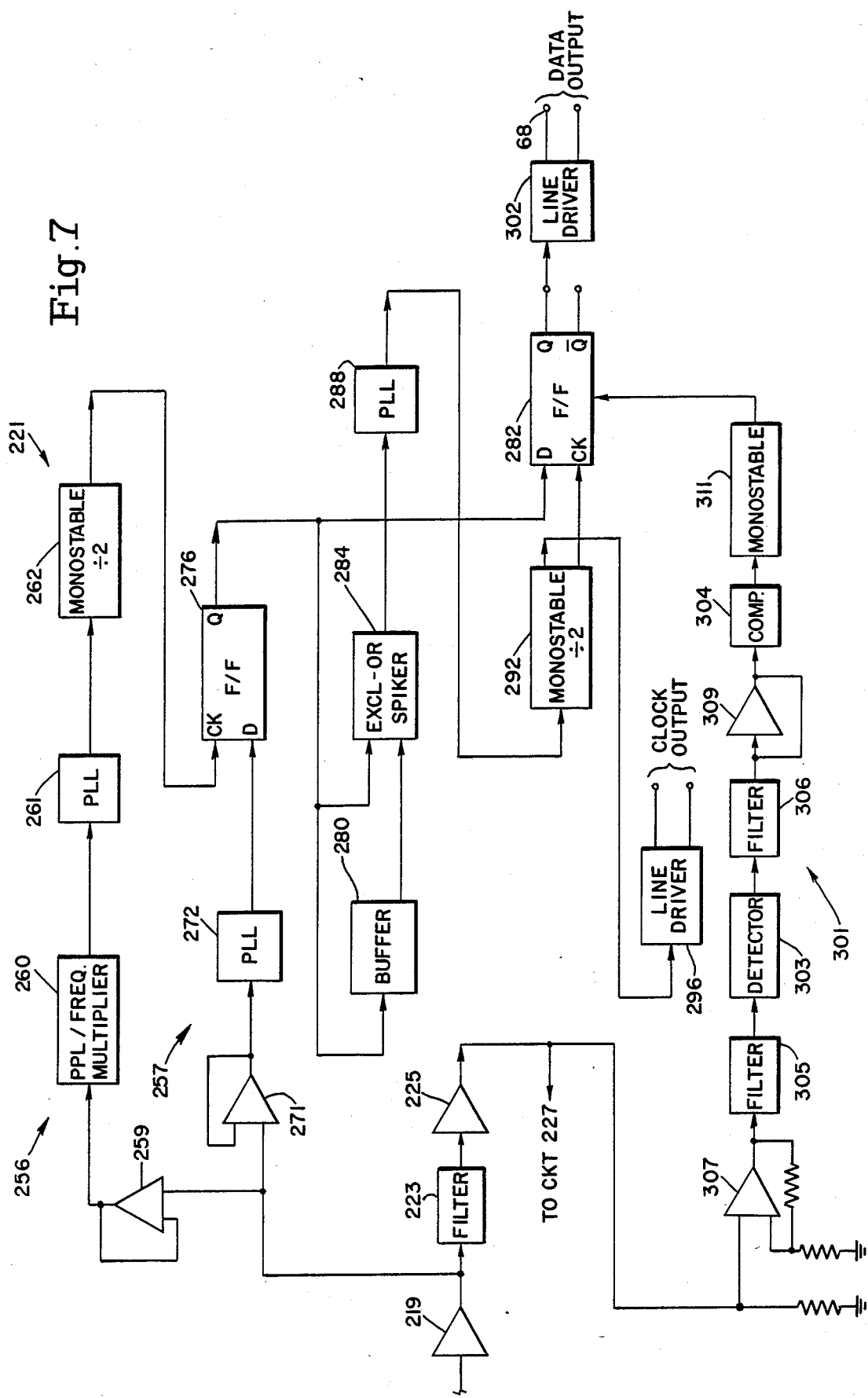
FIG. 7 is a schematic block diagram of one of the signal processors shown in FIG. 3.

Referring to FIG. 7, the IF output signal 212 at the output of amplifier 219 is simultaneously applied to a pair of circuits 256 and 257 in signal processor 221. Circuit 256 regenerates the 1 mHz time reference signal from the IF signal 212. Circuit 257 utilizes the regenerated 1 mHz time reference signal and the IF signal 212 to extract or recover the NRZ data signal and to generate a 62.5 kHz clock signal.

Circuit 256 comprises a voltage follower 259, a pair of phase lock loops 260 and 261 and a monostable multivibrator 262. The 1 mHz IF signal 212 is applied through follower 259 to phase lock loop 260 which locks with the 1 mHz frequency in the IF signal 212 and which doubles the 1 mHz frequency to generate a 2 mHz signal 266 (see FIG. 5). By doubling the 1 mHz frequency, the output frequency of loop 260 will be equal to the 2 mHz frequency of the dual-peaked alternations 250 and 252 in the IF signal to eliminate the dual-peaked alternations. The 2 mHz signal 266 therefore has a constant frequency and is free of any modulation. Signal 266 has the configuration of a full wave rectified signal.

Loop 261 converts signal 266 into a 2 mHz square wave signal 268 (FIG. 5). The signal from loop 261 is applied to multivibrator 262 which divides the 2 mHz square wave signal 268 by two to thus complete the regeneration of the 1 mHz time reference signal which is indicated at 270 in FIG. 5 and which is synchronized with the 1 mHz IF frequency.

Concurrently with the development of the 1 mHz time reference signal 270, the modulated 1 mHz IF signal 212 is applied through a voltage follower 271 to a phase lock loop 272 in circuit 257. Loop 272 is operated at the 1 mHz IF frequency to square the IF signal 212. The modulated square wave subcarrier signal at the output of loop 272 is indicated at 274 in FIG. 5 and corresponds to signal 176.

The squared, modulated IF signal 274 is applied to the data input of a type D flip flop 276 which is clocked by the 1 mHz time reference signal 270. By this flip flop operation, a bi-phase digital signal 278 (FIG. 5) is developed at the Q output of flip flop 276. Signal 278 is a phase inverted reproduction of and has the same bit rate (62.5 kHz) as the target-generated bi-phase signal 86. Signal 278 is also illustrated in the waveform diagram of FIG. 6, which has a 16 μs time base.

The bi-phase signal 278 is applied to a buffer 280, the data input of another type D flip flop 282 and one input of an exclusive OR gate 284 in circuit 257. The output of buffer 280 is applied to the other input of gate 284. With this combination of inputs, gate 284 operates as a spiker, producing a spike signal 286 (FIG. 6) having a positive spike or brief pulse for each transition of the bi-phase digital data signal 278.

Figure 6:
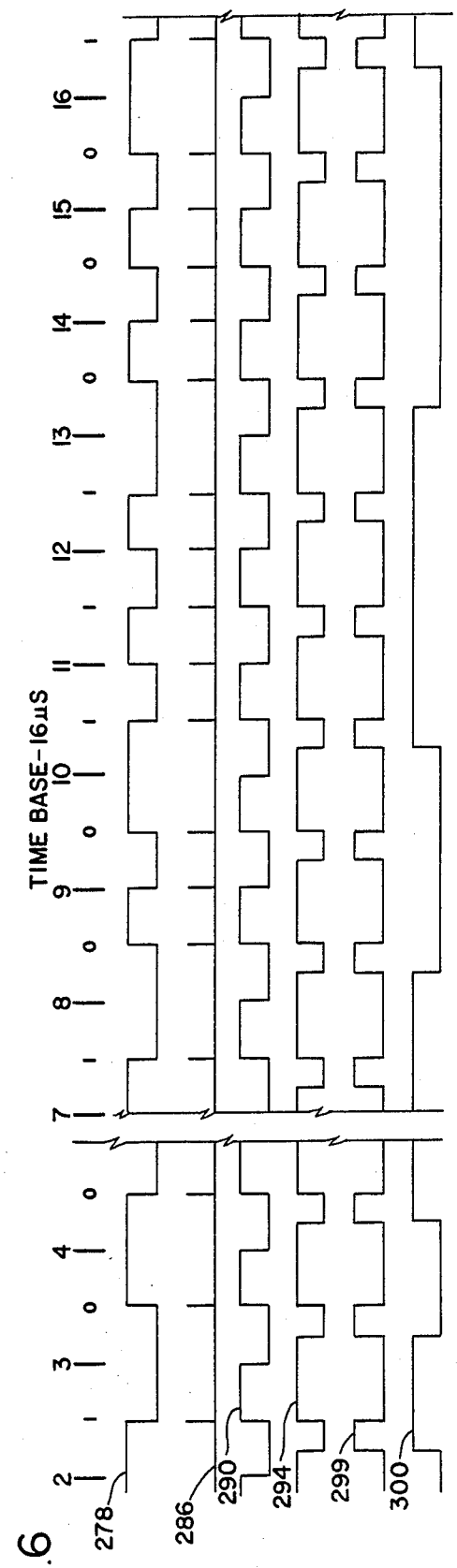

The output of gate 284 is applied to another phase lock loop 288 which operates at twice the frequency of the target's 62.5 kHz clock signal to develop a 125 kHz time reference digital signal 290 (FIG. 6). Signal 290 is synchronized with the 62.5 kHz data signal, but at twice the frequency.

Signal 290 is divided by two in a monostable multivibrator 292 to generate the 62.5 kHz data bit frequency. At one of its outputs, multivibrator 292 develops the 62.5 kHz time reference signal 294 which is used as the digital clock signal. Signal 294 is applied to a line driver 296 for feeding the clock signal to the data processing equipment 30.

Multivibrator 292 has a second output for supplying a second 62.5 kHz reference signal 299 (see FIG. 6) which is the phase-inverted version of the circuit's other 62.5 kHz clock signal 294. Flip flop 282 is clocked by signal 299 to convert the bi-phase signal 278 into the NRZ digital data signal 300 (see FIG. 6) which is a reproduction of the target-generated NRZ signal 84. The NRZ data signal 300 is applied to a line driver 302 for transmission to the data processing station 30.

By transmitting the data in the form of a bi-phase signal, as opposed to an NRZ signal, the 62.5 kHz clock signal 294 can be generated from the recovered bi-phase signal 278 to obviate the need for transmitting a separate clock signal. This is so because, as distinguished from an NRZ signal, the bi-phase signal will always have either one or two transitions, and in no case less than one transition, for each cycle or period of the 62.5 kHz clock signal which was used to clock out the data from memory 74 in target 32. Thus, the spike frequency in spike signal 286 will be shifting between 125 kHz and 62.5 kHz as the data logic state of bi-phase signal 278 shifts from one value to the other. Accordingly, the 62.5 kHz clock signal 294 is generated simply by setting loop 288 to lock with the higher of the two spike frequencies, and then by using multivibrator 292, or any other frequency dividing circuit, to divide the loop's 125 kHz output by two.

By selecting a bi-phase signal bit rate that is significantly lower than the selected 1 mHz IF frequency, the bandwidth of the IF signal is reduced sufficiently so that it will not be distorted by the low pass filter (not shown) in phase lock loop 260. The reduced bit rate of the bi-phase signal thus ensures that dual-peaked alternations 250 and 252 will not distort into single peaks as the signal passes through the phase lock loop.

Because the phase lock loops in signal processor 221 are free running in absence of an incoming signal, extraneous data may develop at the processor's data output 68. Because this extraneous data is completely random, it can accumulate in the digital processing equipment at the data processing station. To avoid this objectionable condition, processor 221 includes a circuit 301 which operates to squelch the transmission of data to the data processing station 30 in absence of an IF signal at the output of the receiver's downconverter. Circuit 301 may be of any suitable design for accomplishing the squelching operation and is shown in FIG. 7 to comprise a detector 303, a comparator 304, a bandpass filter 305, a smoothing filter 306 and an amplifier 307.

Still referring to FIG. 7, the 1 mHz signal at the output of amplifier 225 is applied to amplifier 307 for further amplification. The amplified 1 mHz signal is then passed by filter 305 to detector 303 where is detected. The detected 1 mz signal is smoothed by filter 306 and fed through a voltage follower 309 to comparator 304.

The threshold or reference voltage of comparator 304 is set at a value which will cause the comparator to switch states only if the IF signal is present and is at or above a preselected level. Upon switching states, comparator 304 triggers a multivibrator 311 to enable flip flop 282, thereby permitting flip flop 282 to clock out the NRZ data to line driver 302 and hence to the data processing station 30. In the event that no IF signal is present or that the signal is below the comparator's preselected reference level, comparator 304 operates through multivibrator 309 to inhibit flip flop 282, thereby preventing flip flop 282 from clocking out any data.

The threshold of comparator 304 is set high enough so that in the case of vehicle travel in the direction of arrow 70 (see FIG. 1), a weak reception of the target's reflected interrogating signal will not be of sufficiently high level to trigger comparator 304. For the direction of travel indicated by arrow 70, flip flop 282 will therefore remain inhibited preventing output of data at terminal 68. The data output at terminal 68a will therefore indicated the direction of railroad vehicle travel.

As previously explained, the data stored in the target's memory 74 is read out for modulating the target's subcarrier signal 79 following a delay of approximately 0.5 milliseconds after the target's subcarrier signal 78 is applied to modulate the received interrogating signal. Thus, the unmodulated 1 mHz IF signal will be recovered at the output of the receiver's downconverter approximately 0.5 millisecond before the reception of the data itself to permit the phase lock loops in signal processor 221 to properly lock with their respective frequencies before the data arrives.

Because the transmitted 1 mHz subcarrier signal 186 undergoes a phase inversion as target 32 passes from one of the interrogating signals quarter wavelength fields to the net, there is the possibility that phase lock loop 272 will lock with the inverted signal, rather than the non-inverted signal. If loop 272 locks with the non-inverted signal, the recovered data signal 300 will have the correct phase If loop 274 locks with the inverted signal, however, signal 274 will be phase sifted by 90 degrees. Since flip flop 276 is clocked on the leading edges of signal 270, the phase shift in signal 274 will cause an inversion in the recovered data signal 300. If this condition is not sensed and corrected, the phase of recovered data will be incorrect.

To recognize and correct the foregoing condition a code consisting of a known pattern of bits, such as eight 1's followed by eight 0's, is stored in the target's memory 74 at address locations where it is read out as a prefix to the data bits themselves. Accordingly, the data bits in the recovered data signal 300 will be prefixed by the known bit pattern described above.

Figure 11:
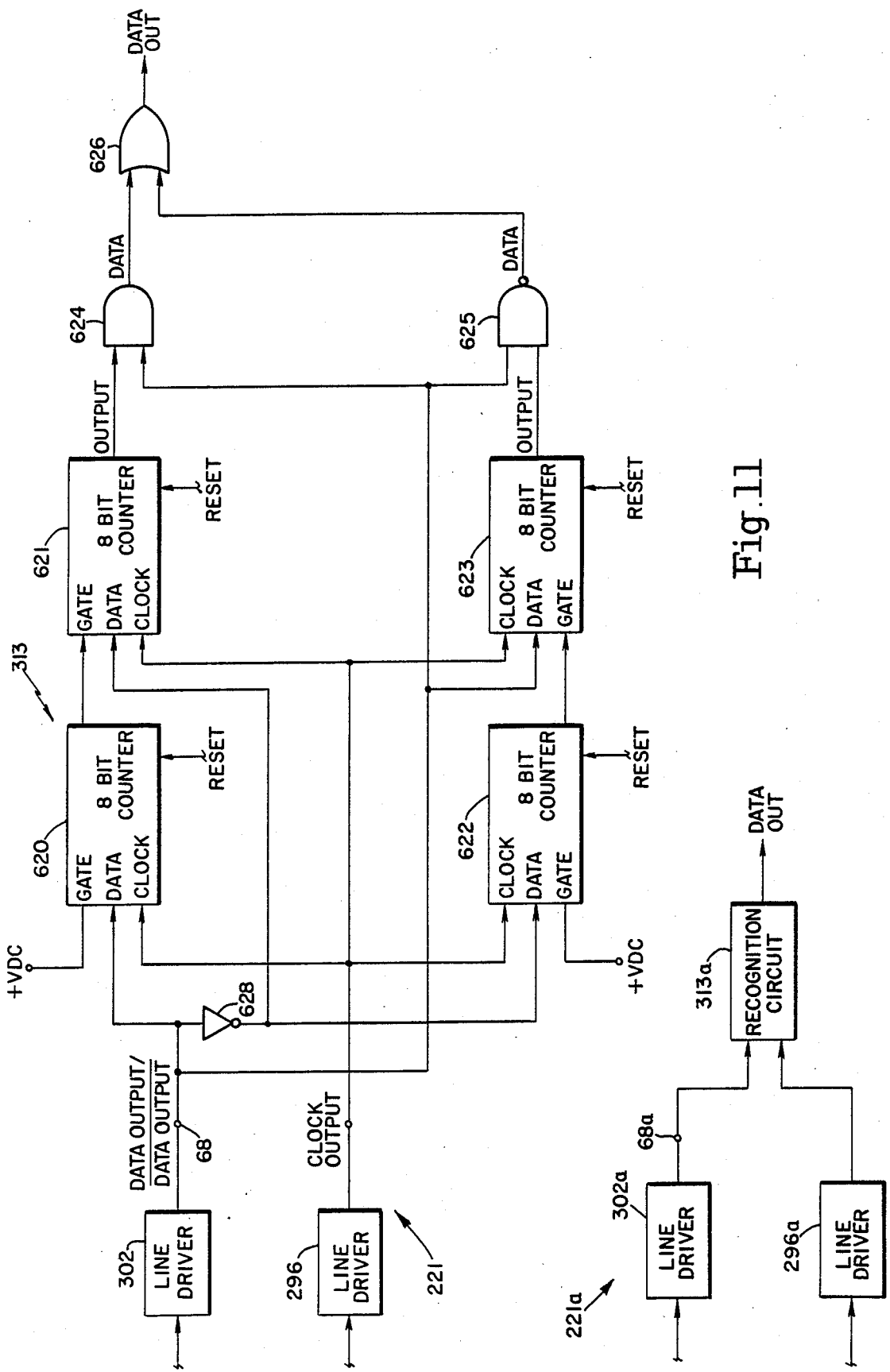
FIG. 11 is a block diagram of a recognition circuit for sensing a phase inversion of the data signal recovered by the interrogating station.

If loop 272 locks with the non-inverted signal, eight 1's will precede the eight 0's in the coded prefix. If, on the other hand, loop 272 locks with the inverted signal to invert signal 300, eight 0's will precede eight 1's in the coded prefix. Any suitable recognition circuit may be used to sense or recognize this inversion such as circuit 313 which is shown in FIG. 11. Circuit 313 may be located in the data processing station 30. Alternatively, it may be located at interrogating station 20.

Referring to FIG. 11, circuit 313 comprises four 8-bit counters 620, 621, 622 and 623, an AND gate 624, a NAND gate 625 and an OR gate 626. The NRZ data signal 300 at the interrogating station's terminal 68 is applied to the data inputs of counters 620 and 623 and to gates 624 and 625. After being inverted by an inverter 628, signal 300 is also applied to the data inputs of counters 622 and 623. The 62.5 kHz clock signal at the output of line driver 296 is applied to the clock inputs of counters 620–623. The gate inputs of counters 620 and 622 are connected to a d.c. voltage source, the gate input of counter 621 is connected to the output of counter 620 and the gate input of counter 623 is connected to the output of counter 622. The outputs of counters 621 and 623 are connected to gates 624 and 625, respectively, and the outputs of gates 624 and 625 are fed to gate 626.

Because of the foregoing circuit connections, counters 620 and 622 will count binary 1 bits in the prefix of data signal 300 and counters 621 and 623 will count the binary 0 bits in the prefix of signal 300. If data signal 300 has the correct phase the eight binary 1 bits will precede the eight binary 0 bits in the signal's coded prefix. Upon counting the eight 1's the output of counter 620 comes high to enable counter 621, thus allowing counter 621 to count the following eight 0's, which are inverted into 1's by inverter 628. The output of counter 621 will therefore come high to enable gate 624. Data signal 300 will therefore be conducted without inversion through gates 624 and 626 to the circuit's data output.

While the foregoing operation is taking place, counter 622 will not advance in count because the code's 1 bits are inverted into binary 0 bits by inverter 628. The output of counter 622 will therefore remain low to inhibit counter 623. Thus, the output of counter 623 also remains low to keep gate 625 disabled, thus preventing the inverted form of signal 300 i.e., $\overline{\text{Data}}$) from being gated through to the circuit's data output.

If, on the other hand, signal 300 has been phase shifted into its inverted form, the coded prefix at terminal 68 will have eight 0's followed by eight 1's. Counter 622 will count the first eight bits in the prefix because they will have been inverted into 1's by inverter 628. Counter 620, on the other hand, will not advance in count because the first eight bits applied to its input are binary 0's. Thus, the output of counter 622 will come high to enable counter 623, while the output of counter 620 remains low to inhibit counter 621. The output of counter 621 therefore remains low to keep gate 624 disabled, thus preventing the non-inverted form of signal 300 from being gated to the circuit's output.

In the meantime, counter 623, having been enabled, will count the eight binary 1's which follow the eight binary 0's coded prefix. The output of counter 623 will therefore come high to enable gate 625 which inverts signal 300, so that the inverted form of signal 300 will be applied to the circuit's output. Accordingly, the data signal at the output of gate 626 will have the correct phase even though signal 300 has been inverted due to the phase lock loop action described above.

A separate recognition circuit 313a may be provided for the signal channel containing signal processor 211a. Circuit 13a may be of the same design as circuit 313.

Figure 8:
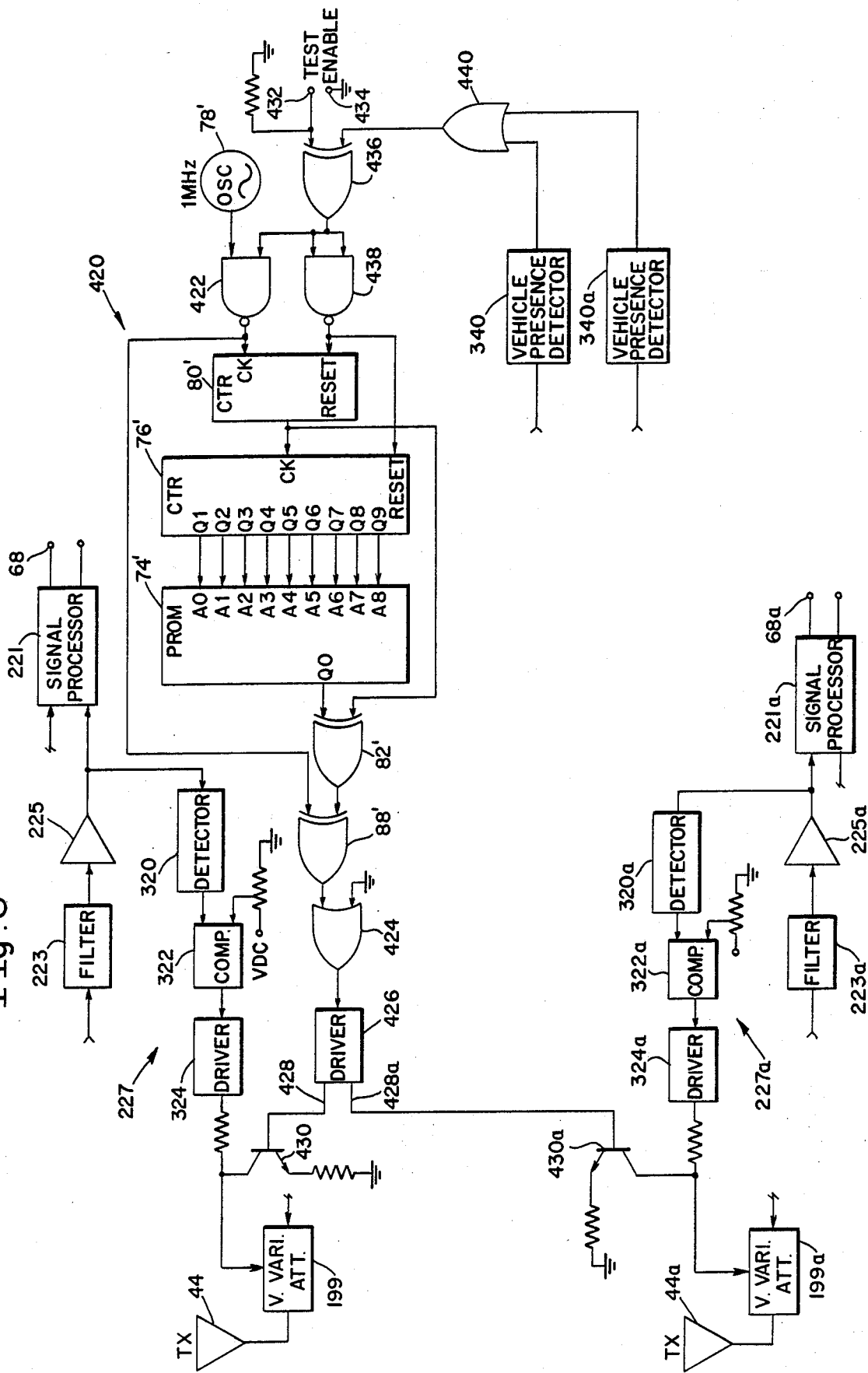
FIG. 8 is a block diagram of the self-test and power control circuits shown in FIG. 3.

As shown in FIG. 8, power control circuit 227 comprises a detector 320, a comparator 322 and a current driver 324. The filtered 1 mHz IF signal at the output of amplifier 225 is applied to detector 320 where it s detected. The detected 1 mHz IF signal at the output of detector 320 may be smoothed to provide a steady d.c. level by an unshown filter and is applied to comparator 322 for comparison with a selectively set reference voltage. Comparator 322 is designed to produce an output voltage which is equal or proportional to the difference between the two comparator inputs, namely the reference voltage and the d.c. voltage which is equal or proportional to the d.c. average of the detected 1 mHz signal.

The difference voltage at the output of comparator 322 is applied to driver 324. Driver 324 develops a d.c. control signal current which varies with the difference voltage at the output of comparator 322. The d.c control signal is applied to attenuator 199 to control the impedance of attenuator 199 and thus to control the power level of the 915 mHz interrogating signal which is conducted to antenna 44 for radiation.

When no target is present to reflect the transmitted interrogating signal, receive antenna 46 will receive a low level leakage of the interrogating signal which is coupled directly from transmit antenna 44 to receive antenna 46 due to the proximity of the two antennas. This low level leakage signal is downconverted in the downconverter portion of receiver 50 to develop a correspondingly low level IF signal at the output port 213 of coupler 210 and, consequently, at the output of amplifier 225. Accordingly, when no target is present to reflect the transmitted interrogating signal, the IF signal level at the output of amplifier 225 will be at its minimum level and will be due only to the interrogating signal leakage which is coupled directly from antenna 44 to antenna 46.

The output of comparator 322 therefore increases to a maximum to increase the current which driver 324 supplies to attenuator 199, thus reducing the impedance of attenuator 199 to its minimum value. As a result, the transmitted interrogating signal power is increased to a maximum level.

When a reflected interrogating signal is received at receiver 50 due to the presence of target 32, the output of comparator 322 deceases to decrease the current output of driver 324. The impedance of attenuator 199 therefore rises, thus increasing the attenuation of the interrogating signal and consequently decreasing the power level in the radiated interrogating signal.

In accordance with a further aspect of this invention, the signal channel containing the transmitter-receiver unit 34 is shown in FIG. 3 to comprise a vehicle presence detector 340, a target presence detector 342, and a condition-sensing "clean list" generator 44. The vehicle presence detector operates to sense the presence of each passing railroad vehicle regardless of whether the vehicle has a target or not. The target presence detector 342 operates to sense the presence of a target (32) on a passing railroad vehicle even though one or more of the target's main circuits are defective, resulting in a failure of the target to transmit the information stored in the target's memory 74. If a passing railroad vehicle is carrying a working or operative target (32), the NRZ data clock will be generated at the output of line driver 296 (which serves as the clock output of processor 221) to indicate the presence of a working target. Three conditions are therefore sensed at interrogating station 20, namely the passage of a railroad vehicle through the interrogating signal field, the presence of a target (operative or not) on the passing railroad vehicle, and the presence of a working target on the passing vehicle.

The outputs of detectors 340 and 342 and clock output of processor 221 are applied as inputs to generator 344. Utilizing these inputs, generator 344 compiles a "clean list" for all the railroad vehicles in each train passing interrogator station 20. For each railroad vehicle in the passing train, the clean list will indicate the appropriate one of the following three conditions: the passing railroad vehicle has no target; the passing vehicle has a target, but it is defective; or the passing vehicle has a target which is in working order.

The vehicle presence detector 340 operates on the principle that surface variation on the underside of a passing railroad vehicle will create a low frequency disturbance in the antenna leakage field between the transmit and receive antennas to develop a low frequency IF output signal at port 346 of coupler 210. The low frequency signal at port 346 will not have proper phasing to appear at the coupler's other output port 213 so that no corresponding output will be developed by processor 221.

The vehicle presence detector 340 (see FIG. 9) is connected to the coupler port 346 and comprises a suitable detector device 348, a smoothing filter 350, a comparator 352 and a one shot multivibrator 354. The low frequency output signal at the coupler port 346 is detected by the detector device 348, is smoothed by filter 350 and then applied to comparator 352 for comparison with a fixed, preselected reference voltage.

If no railroad vehicle is present to create the disturbance in the interrogating signal field, the output of comparator 352 will remain low. However, if a railroad vehicle passes through the interrogating signal field to disturb the field, the resulting output at port 346 of coupler 210 will therefore be detected, causing the output of comparator 352 to change states. The change in states at the output of comparator 352 triggers multivibrator 354, causing the d.c. output of detector 340 to change states from low to high, thus indicating the presence of a railroad vehicle even for situations where the vehicle is not carrying a target.

Because of the small coupler surface area between adjacent railroad vehicles in a passing train, any disturbance in the interrogating signal field will not be sufficient to maintain comparator 352 in its high state. Detector 340 will therefore produce a separate output pulse for each vehicle in the passing train so that the passage of a railroad train through the interrogating signal field will result in a corresponding train of time-spaced pulses 357 (see FIG. 10) at the output of detector 340.

Referring back to FIG. 9, the target presence detector 342 is connected to an output port 359 of coupler 211 and comprises an amplifier 358, a 25 kHz bandpass filter 360, a detector device 362, a smoothing filter 364, a comparator 363 and a one shot multivibrator 365. Because of the bandpass filter 360, only a 25 kHz signal component in the received signal will be detected by detector 362.

Assuming that the highly reliable 25 kHz signal modulating circuit in target 32 is operative to modulate the target's outgoing signal, the 25 kHz component will be recovered, causing the output of comparator 363 to come high, and thus triggering multivibrator 36 to produce a pulse which indicates that a target is present on the passing railroad vehicle, although it may not necessarily be fully operative.

Accordingly, the output of the target presence detector 342 will come high to produce a pulse for each vehicle which has a target. In the absence of the 25 kHz signal component, the output of detector 342 will be low, signifying that the passing vehicle most likely is not carrying a target.

Figure 9:
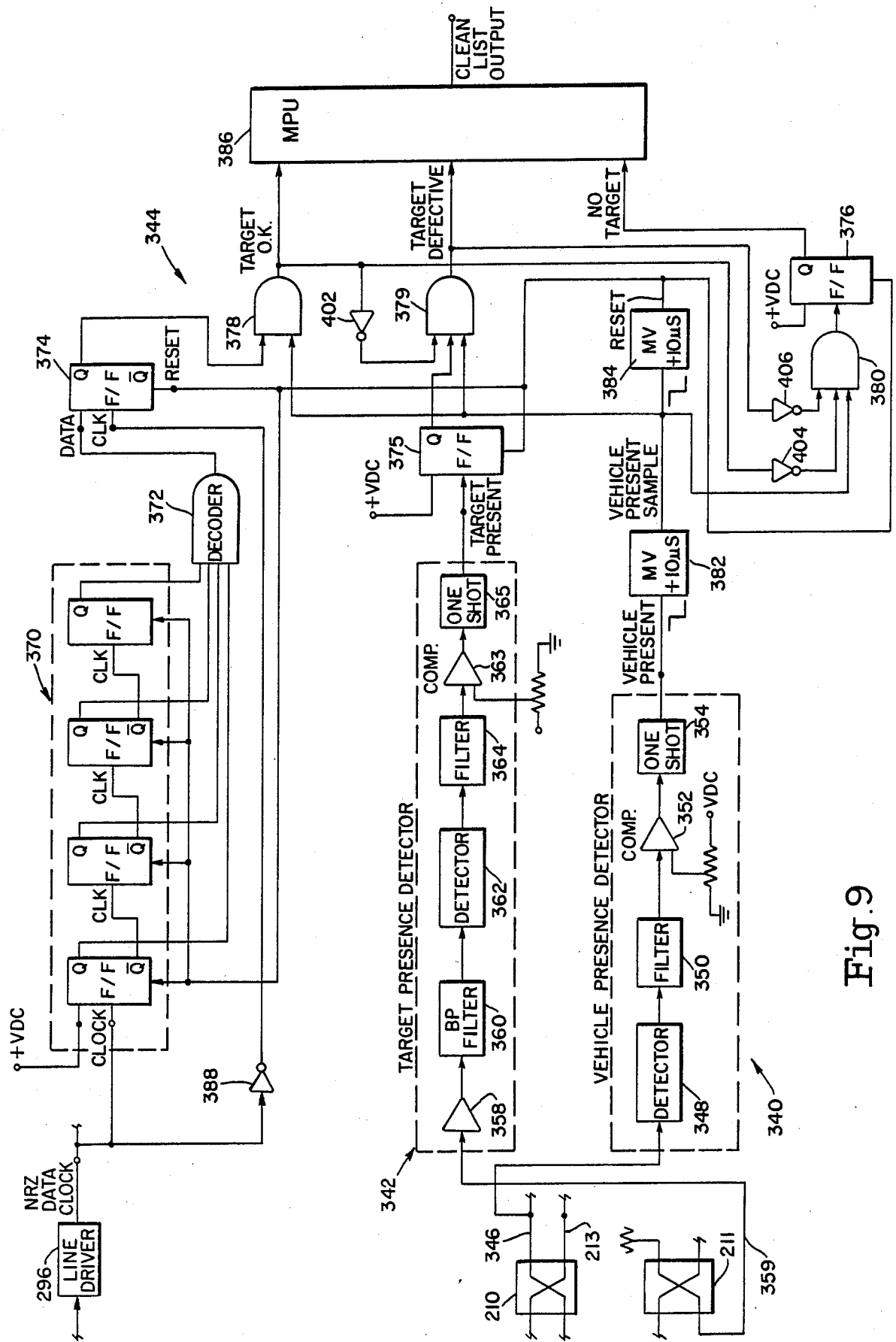
FIG. 9 is a schematic circuit diagram of the vehicle presence detector, the target presence detector and the clean list generator shown in FIG. 3.

Any suitable logic may be employed in generator 344 for utilizing the outputs of detectors 340 and 342 and the NRZ data clock to develop the clean list mentioned above. In FIG. 9, for example, generator 344 is shown to comprise a multistage counter 370, a decoder in the form of an AND gate 372, flip flops 374, 375 and 376, a pair of one shot multivibrators 382 and 384, a microprocessor 386, and a set of three condition-indicating AND gates 378, 379 and 380 connected by interrupting lines to microprocessor 386.

Each vehicle presence pulse at the output of detector 340 is applied to trigger multivibrator 382 for developing a short pulse which is indicated at 381 in FIG. 10. Pulse 381 triggers multivibrator 384 for developing a delayed pulse (indicated at 383 in FIG. 10) which resets flip flops 374–376 and all of the stages in counter 370. As shown in FIG. 10, pulse 381 occurs at the trailing edge of each positive going vehicle presence pulse, and pulse 333 occurs shortly after pulse 381 and before the occurrence of the next vehicle presence pulse. Accordingly, flip flops 374–376 and counter 370 will be reset for each vehicle which is sensed or detected.

Counter 370 is connected to the clock output of processor 221 and has a sufficient number of stages to count a number of clock pulses at least equal to the number of data storage bit locations in the target's memory 74. In the target embodiment of FIG. 4, it will be recalled that memory 74 was described as having 512 storage bit locations, thus requiring counter 370 to have sufficient number of stages to count at least 512 clock pulses.

The output of the counter's stages are connected to separate inputs of gate 372 so that when pulse count in counter 370 reaches a number equal to the number of storage bit locations in memory 74, the output of gate 372 will come high. The output of gate 372 is applied to the data input of flip flop 374. Thus, when the proper number of clock pulses are counted, the output of gate 372 will come high, causing the Q output of flip flop 374 to come high indicating that a target is present and is in working order. In addition to being applied to the clock input of counter 370, the NRZ data clock pulses at the clock output of processor 221 is inverted by an inverter 388 and applied to flip flop 374 to clock the flip flop.

The Q output of flip flop 374 is applied to one input of gate 378, and the pulse output of multivibrator 382 is applied to the other input of gate 378. Therefore, the output of gate 378 will come high to indicate the presence of a working target only if the proper number of clock pulses have been counted and detector 340 has sensed the presence of a railroad vehicle in the interrogating signal field.

Still referring to FIG. 9, the output of the target presence detector 34 is applied to flip flop 375. Accordingly, when a target is sensed by detector 342, the Q output of flip flop 375 will come high. The Q output of flip flop 375 is applied to one input of gate 379. The output of gate 378, upon being inverted by an inverter 402, is applied to a second input of gate 379, and the output of multivibrator 382 is applied to a third input of gate 379. By this logic, it will be appreciated that the output of gate 379 will come high to indicate the presence of a defective target only if detector 340 has sensed the passage of a railroad vehicle through the interrogating signal field, detector 342 has sensed the presence of a target on the passing railroad vehicle and the output of gate 378 is in its low state indicating that the data has not been received from the target on the passing vehicle.

Still referring to FIG. 9, the output of multivibrator 382 is applied to one input of gate 380. The output of gate 378, upon being inverted by an inverter 404, is applied to a second input of gate 380, and the output of gate 379, upon being inverted by another inverter 406, is applied to a third input of gate 380. Because of this logic, the output of gate 380 will come high to indicate the absence of a target on a passing vehicle only if detector 340 detects the presence of the passing vehicle, the output of gate 378 is low, indicating the absentee of a working target, and the output of gate 379 is also low, indicating the absence of even a defective target.

From the foregoing, it will be appreciated that for each passing railroad vehicle, the output of only one of the logic gate 378–380 can come high. Further, through the reset operation for counter 370 and the flip flops in generator 344 each passing railroad vehicle is separately and independently examined to determine whether or not the passing vehicle has a target, and if it has a target, whether or not the target is in working order. Microprocessor 386 interprets the output conditions of gates 378–380 for each passing vehicle to supply an output signal indicating the sensed condition for each vehicle. The microprocessor output may be fed to the central data processing station 30 or some other terminal for processing and readout.

The clean list output signal of microprocessor 386 will therefore tell the central data processing station how many railroad vehicles were in the passing train, how many vehicles in the passing train did not have a target, and how many vehicles had a defective target.

As shown in FIG. 3, the signal channel containing the transmitter-receiver unit 36 is the same as that just described for the signal channel containing the transmitter-receiver unit 34. Accordingly, like reference numerals have been applied to designate like components in the two signal channels except that the reference numerals used for the signal channel containing unit 36 have been suffixed by the letter "a" to distinguish them from those used for identifying the various parts of the signal channel containing unit 34. As shown in FIG. 3, the output 198a of power divider 196 applies the 915 mHz signal to the quadrature coupler 208a in receiver 50a. Operation of the common circuits in the two signal channels are the same.

Referring back to FIG. 8, interrogating station 20 is equipped with a selectively actuatable, built-in, self-test circuit 420 for testing the operation of both signal channels in the station. Self-test circuit 420 corresponds closely to the modulating and memory circuit in target 32. To the extent that the self-test circuit 420 is similar to the target's circuit, like reference numerals have been applied to designate like components except that the reference numerals used for circuit 420 have been primed to distinguish them from the reference numerals used for target 32.

In circuit 420, the 1 mHz signal generated by oscillator 78' is supplied through a NAND gate 422 to the clock input of counter 80' which counts the 1 mHz pulses similar to counter 80. The 62.5 kHz divide-by-sixteen output of counter 80' is applied t the clock input of address counter 76' to advance the address counter, and the Q1-Q9 outputs of counter 76' are connected in parallel to the address terminals of memory 74' to sequentially address the different storage bit locations in the memory for reading out the bits of binary information stored in the memory. The information stored in memory 74' may be any preselected code for testing the operation of the interrogating station.

The binary bits stored in memory 74' are serially read out at the 62.5 kHz clock or bit rate in the form of an NRZ digital signal comparable to signal 84 (see FIG. 5). The digital NRZ code signal from memory 74' and the 62.5 kHz clock signal are applied to gate 82' which converts the NRZ signal into a bi-phase signal comparable to signal 86 which is shown in FIG. 5.

The added, bi-phase digital signal at the output of gate 82' is applied to gate 88' to phase modulate the oscillator's 1 mHz signal for producing a modulated subcarrier signal comparable to signal 176. Accordingly, the modulated signal at the output of gate 88' simulates or emulates the modulated subcarrier signal 176 in target 32.

The target-simulating modulated oscillator signal at the output of gate 88' is applied through an OR gate 424 to a dual output driver 426 having signal output ports 428 and 428a. The target-simulating modulated oscillator signal at port 428 is applied to the base of an NPN transistor 430 which is connected in control circuit 227 to provide a voltage-dividing shunt at the output of driver 344.

The positive going pulses representing the high or logic 1 state in the target-simulating modulated oscillator signal will turn transistor 430 on, thus completing the shunt circuit at the output of driver 324. When this happens, the control current supplied by drier 324 to attenuator 199 reduces to a minimum to cause the impedance of attenuator 199 to increase sufficiently to reduce the level of the transmit interrogating signal to zero at antenna 44.

When the target-simulating oscillator signal at the base of transistor 430 is in its alternate, zero state, transistor 430 will turn off, thus opening the shunt at the output of driver 324. The current supplied by driver 324 to attenuator 199 will therefore increase to reduce the attenuator's impedance to its minimum value. As a result, the transmitted interrogating signal level at antenna 44 will be increased to a maximum level.

Thus, by switching transistor 430 on and off with the target-simulating modulated oscillator signal, the interrogating station's 915 mHz interrogating signal will be amplitude modulated by the target-simulating oscillator signal. The modulated interrogating signal is radiated by antenna 44 to the receive antenna 46 and simulates the modulated interrogating signal which is reflected by target 32.

The modulated, target-simulating interrogating signal is therefore received by receiver 50, and if all of the circuits in the signal channel are in working order, the 1 mHz IF output signal will be recovered and processed in processor 221 to recover the 62.5 kHz clock and the coded digital signal supplied by memory 74'. These signals are transmitted to the central processing station 30 or some other terminal for comparison with a replica of the original code stored in memory 74'. Failure of the received digital signal to match with the original code indicates a fault in one or more of the signal-handling circuits in the interrogating station. In such a case, an audio or visual signal may be produced at station 30 to alert an operator. On the other hand, a match between the received digital signal and the original code indicates that the interrogating station's circuits for the channel containing receiver 50 are working properly. From the foregoing description it will be appreciated that all of the circuits making up the signal channel, including the transmitter-receiver unit 34 and processor 221, are tested by operation of the self-test circuit 420.

Being the same as control circuit 227, control circuit 227a also has a transistor 430a (see FIG. 8) corresponding to transistor 430. The target-stimulating, modulated oscillator signal at the second output 428a of driver 426 is applied to the base of transistor 430a, thus modulating the interrogating signal which is transmitted by antenna 44a simultaneously with the modulation of the signal which is transmitted by antenna 44. Accordingly, both signal channels in the interrogating station are simultaneously tested by operation of self-test circuit 420.

Still referring to FIG. 8, circuit 420 is selectively enabled by an external command or test enable signal which is applied across terminals 432 and 434. The command signal may be generated at station 30, or some other terminal. The command signal is conducted through an exclusive OR gate 436 for enabling gate 422 and thereby providing for the application of the 1 mHz oscillator signal to the clock input of counter 80'. In addition, the command signal is applied through another NAND gate 438 to the reset pins of counters 76' and 80' to remove counters 76' and 80' from their reset modes and thus initiating operation of the self-test circuit 400 to test both signal channels in interrogating station 20.

To avoid interference with the collection of data from a passing railroad train, the outputs of the vehicle presence detectors 340 and 340a are OR'd by a gate 440 and applied to gate 436. Because of this logic, gate 436 will be inhibited to automatically prevent operation of self-test circuit 420 whenever the output of either vehicle presence detector or the outputs of both vehicle presence detectors come high as a result of sensing the presence of a railroad vehicle.

Referring back to FIG. 3, a small pickup coil 443 is inductively coupled to exciter coil 40 in station 20 to monitor the field status of coil 40. The field produced by coil 40 is a true representation of the current level in coil 40. The current induced in pickup coil 443 is therefore indicative of the current level in coil 40.

Coil 443 is connected to a peak amplitude detector 445 and the output of detector 445 is connected to a comparator 447 for comparison with a reference voltage. This circuit arrangement is such that if the current flow in coil 40 is at is proper operating level, the output of detector 445 will be at a high value, causing the output of comparator 447 to remain low. If coil 40 becomes defective to interrupt or diminish the flow of current, the output of detector 445 will decrease, causing the output of comparator 447 to come high to signal the presence of a defect in coil 40.

The output of comparator 447 may be applied to gate 440. This has the effect of disabling or inhibiting operation of the self-test circuit 420 when the output of comparator 447 comes high. The failure of circuit 420 to respond to repeated test enable or command signals serves as an indication that coil 40 is defective.

The target's memory 74 may be encoded at the factory. Alternatively, it may be encoded in the field after it has been soldered or otherwise connected to the remainder of the target's circuit. One embodiment for field encoding the target's memory 74 is shown in FIG. 12 and is of the hand-carried portable type.

The field encoder of FIG. 12 is shown to comprise PROM writer 450 and a suitable input device such as a keyboard 452. Keyboard 452 may be of any suitable, preferably portable, type. PROM writer 450 may also be of any suitable conventional type except that the writer's output socket is replaced by a special output device 454, commonly referred to as a bed of nails.

Memory 74 is in the form of a chip 456 having a set of usually twelve input terminals or contact pins 458. Chip 456 is mounted on a printed circuit board 460 along with the remainder of the target's circuit, and all of the chip's terminals are soldered to the appropriate points in the target's circuit on board 460. The ROM writer's output device 454 has a set of spring loaded output contacts 462 corresponding in number and arrangement to the memory chip's terminals 458.

In order to encode memory 74 in the field with the encoder of FIG. 12, the target's circuit board 460 containing the target's complete circuit (including chip 456) is shipped from the factory without being assembled in the target's casing. In the field, an operator desiring to encode memory 74 checks the identification number of a selected railroad vehicle, inputs the identification number and/or any other data on keyboard 452 to load the data in writer 450, and upon positioning the bed of nails type output device 454 in position where contacts 462 make contact with the chip's terminals 458, operates a write switch 464 to transfer the data out of writer 450 and to fuse it into memory 74. Thereafter, the target circuit board 460 is assembled in the target's casing and the assembled target is then mounted on the railroad vehicle.

FIGS. 13-15 show another embodiment in which the target 32 is specially constructed to permit field encoding the target's memory 74 after the target is fully assembled and even mounted on a railroad car or other vehicle. As shown in FIG. 14, the target's printed circuit board 460 is mounted in a casing 466 and has a set of breakable contact tabs 468. Tabs 468 project through a side opening 467 in housing 466 and are connected by conductors 470 to the contacts 458 on chip 456. As shown, tabs 468 project beyond the target's casing 466 and are arranged in a straight row in parallel spaced apart relation to one another.

The portable, hand-carrie encoder shown in FIGS. 13-15 is the same as that shown in FIG. 12 except that the writer 450 is provided with a socket 472 in place of tee bed of nails 454. Socket 472 embodies a set of output contact elements 474 corresponding in number ad arrangement to the target's tabs 468 so that when socket 472 is seated against a face on casing 466 in registry with the housing's opening 467, contacts 474 make sliding contact with tabs 468.

To encode the target's memory 74 with the encoder of FIGS. 13-15, the data is loaded into writer 450 through operation of keyboard 452. Socket 472 is then positioned in the manner shown in FIG. 14 to establish contact between contact elements 474 and tabs 468. Write switch 464 is then operated to fuse the data into memory 74. Thereafter, socket 472 is tilted in a direction where a knife edge 476 on the socket bears against tabs 468 to snap off the projecting end portions of tabs 468 at the mouth of the opening 467. After removing socket 472 from casing 466, opening 467 may be filled with a suitable compound to seal the interior of casing 466 and also to prevent access to the broken ends of tabs 468.

The field encoders of FIGS. 12 and 13 are particularly useful for field encoding selected targets for a waiting train in which some or all of the railroad cars are equipped with targets 32. To accomplish this, the operator may simply walk along the train, stopping at each target to be field encoded, and encoding the memory in the selected target before moving on to the next target in the train.

Figure 16:
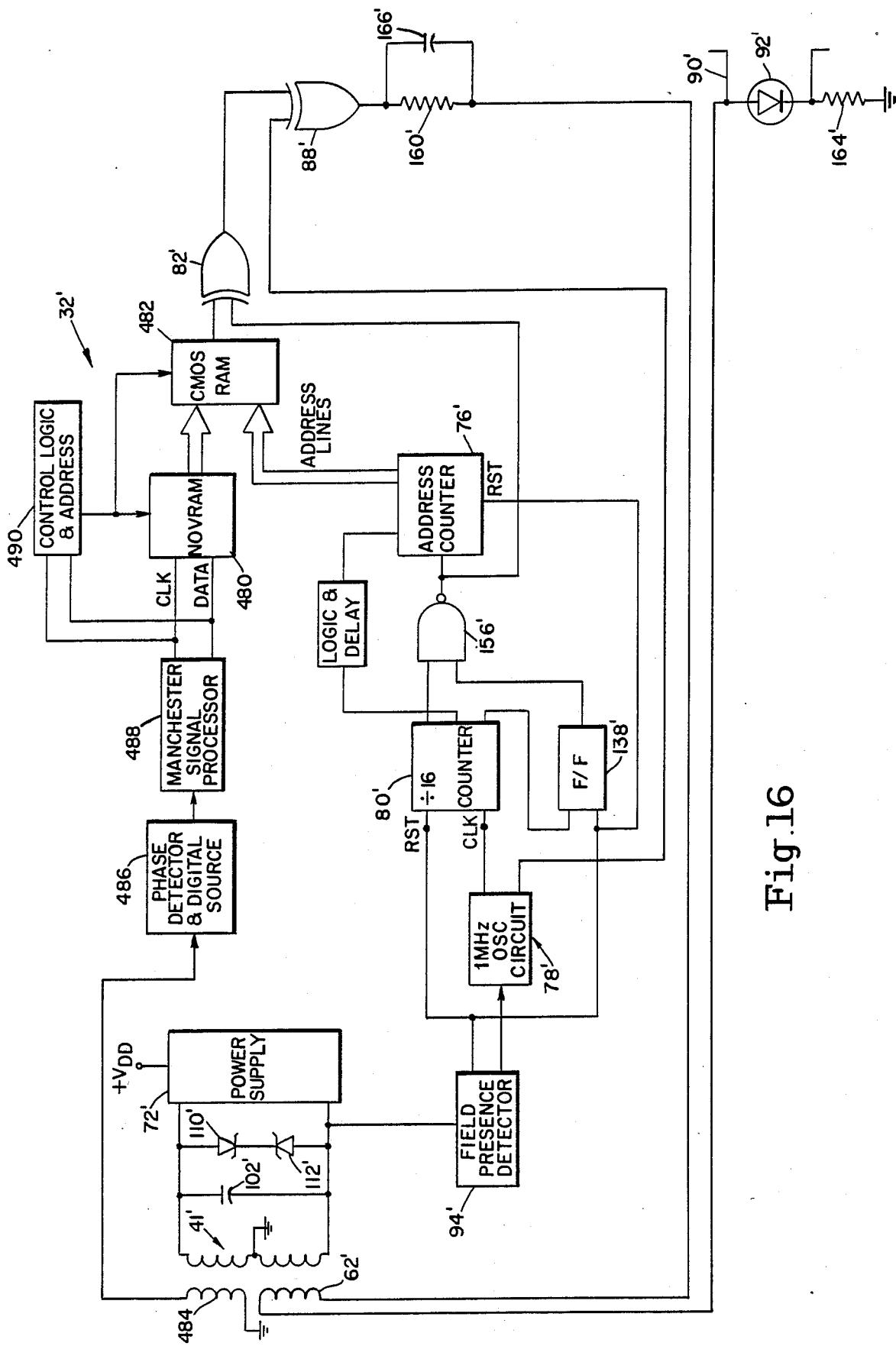
FIG. 16 is a block diagram of another embodiment of a target having a nonvolatile electrically-erasable read/write memory for enabling data, such as waybill information, to be erasably written into the target's memory.

FIG. 16 shows a target 32' which is the same as target 32 except that the PROM type memory 74 is replaced with a NovRam 480, and a regular RAM (random access memory) 482. Target 32' also differs from target 32 in that it is equipped to receive data and to store it in NovRam 480. NovRam 480 is used in conjunction with RAM 482 to serve as an electrically erasable nonvolatile data base in the target. This data base may be utilized to receive and store, for later recall, selected information such as waybill information for a particular freight car shipment.

To the extent that targets 32 and 32' are the same, like reference characters have been applied to like components except that the reference characters used for target 32' have been primed to distinguish them from those used for target 32.

NovRam 480 comprises a conventional static RAM, a nonvolatile $E^2$PROM and internal control logic. NovRam 480 is capable of being instructed to either read or write by using an electrical input instruction set or by controlling its store and recall inputs. RAM 482 may be of any suitable conventional type such as a CMOS RAM.

The circuitry for receiving a data-bearing signal, demodulating the data-bearing signal and storing the recovered data in NovRam 480 is shown in FIG. 16 to comprise a secondary coil 484, a demodulator 486, a signal processor 488 and a control logic circuit 490.

The transmitter for transmitting a data-bearing signal to target 32' may be a part of the interrogating station 20 or a separate station. In the illustrated embodiment (see FIG. 17), interrogating station 20 is equipped to transmit the data-bearing signal. In this embodiment, station 20 is provided with a phase modulator 492 for phase modulating the station's 25 kHz power signal with a digital data signal. The digital data signal is supplied by a suitable input device 494 and is applied through a suitable digital control logic 496 to modulator 492.

The phase modulated power signal is inductively coupled by coil 40 into the target's coil 41 when the target is moved into the interrogating station's exciter field to supply power to the target as previously described. Being tuned by capacitor 102', the target's coil 41 receives only the 25 kHz signal.

The phase modulated power signal is additionally coupled into the target's secondary coil 484 for application to demodulator 486. Demodulator 486 comprises a suitable, conventional phase detector and a digital source for demodulating the incoming signal. The demodulated signal is applied to processor 488 which is of the Manchester type for developing the digital data signal at one output and a clock or bit rate signal at a second output. The clock signal at the output of processor 488 has a pulse frequency corresponding to the bit rate of the digital data signal at the processor's data output.

Both the clock and the data signal are applied to NovRam 480 and also to the control logic circuit 490. Control logic circuit 490 comprises any suitable logic gate circuit for recognizing a write code which prefixes the data itself.

Upon recognizing a write code from processor 488, control logic circuit 490 applies a write signal to NovRam 480, thereby writing the incoming data into NovRam 480 and electrically erasing old data stored in the NovRam.

In the interrogating phase in which it is desired to recall the data stored in NovRam 480, the 25 kHz power signal is phase modulated with a digital read and transfer code which is transmitted from station 20 and thus coupled into target for application to demodulator 486. The demodulated signal components are applied to processor 488 which applies the recovered read and transfer code to control logic circuit 490. Upon recognizing the read and transfer code, the control logic circuit 490 applies a read and transfer signal to NovRam 480 and a write signal to RAM 482. As a result, the data stored in NovRam 480 is transferred to and stored in RAM 482. At this stage, therefore, the data will be stored in both NovRam 480 and RAM 482.

As the vehicle-mounted target leaves the power signal field, counters 76' and 80' are switched out of their reset modes, thus setting the circuit in operation for addressing RAM 482 to serially read out the data bits in RAM 482.

The data read out of RAM 482 is applied to modulate the target's 1 mHz subcarrier signal which, in turn, is conducted through diode 92 to modulate the interrogating signal as the target moves through the interrogating signal field, all as previously described in conjunction with the embodiment shown in FIG. 4.

Upon reception of the modulated reflection of the interrogating signal, the interrogating station 20 demodulates the reflected signal and processes the components of demodulation to recover the data which was recalled from NovRam 480.

Because of the read/write capability of NovRam 480, the complete contents of a waybill may be transmitted to target 32' for storage in NovRam 480 at a shipment's point of origin for later recall at the shipment's destination point, thus completely eliminating the physical handling of waybill documents. In addition to the particulars about the shipment, the waybill information stored in NovRam 480 includes the identification of the freight car hauling the shipment so that the location of the freight car can be monitored at preselected points intermediate the points of origin an destination.

Alternatively, or additionally, maintenance information may be stored in NovRam 480. Storage of maintenance information is particularly useful for locomotives.

Figure 17:
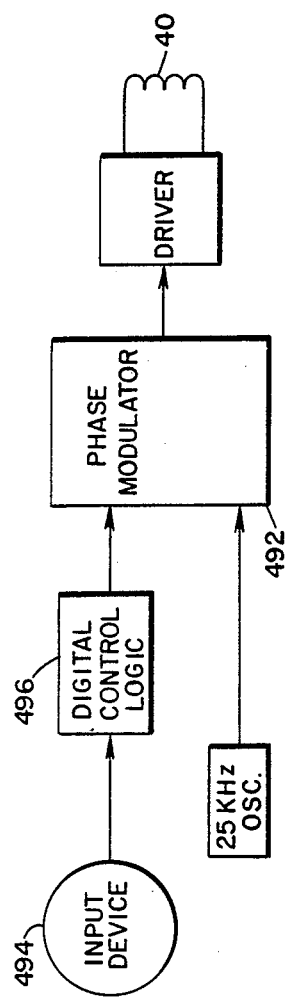
FIG. 17 is a block diagram of a transmitter for transmitting data to the target embodiment shown in FIG. 16.

Other modulation techniques may be used in place of the phase modulation design shown in FIG. 17. For example, one may employ the bi-phase/subcarrier design which was previously described for the transmission of data from target 32. In the bi-phase/subcarrier technique, a subcarrier signal is modulated with a data-bearing digital bi-phase signal (similar to signal 86), and the modulated subcarrier is modulated onto a carrier signal which is transmitted from the station to the target for reception and demodulation by the latter. In such a case the target's demodulation circuit would correspond to the circuit used in station 20 for recovering the data-bearing signal.

A preselected group of data storage locations in NovRam 480 may be assigned to store so-called permanent data, such as an identification of a freight car, and the remaining storage locations in NovRam 480 may be assigned to hold transient data such as waybill information pertaining to the shipment then being hauled by the freight car. To read out the permanent data, but not the transient data, the input device 494 in the transmitter of FIG. 17 is operated to modulate the outgoing 25 kHz signal with a preselected plural bit address signal, which is recognized and decoded by control circuit 490 in target 32' to address just those NovRam storage locations containing the permanent data. Accordingly, just the permanent data will be read out of NovRam 480 and written in RAM 482 in response to a subsequently applied write and transfer signal. Upon reception of an rf interrogating signal from station 20, target 32' will transmit the data in RAM 482 in the form of a modulating signal component as previously described, but in this instance only the so-called permanent data will be transmitted and not the transient data, because only the permanent data was transferred to RAM 422.

The foregoing selective read-out of data from NovRam 480 is advantageously utilized to transmit just the freight car's identification or some other type of permanent data, as the car passes interrogating stations situated along a route between the car's origin and destination points to keep track of the car's whereabouts while it is in transit without requiring the entire contents of NovRam 480 to be read out each time the freight car passes an interrogating station.

At any selected time at any selected interrogating station, the transient data in NovRam 480 may also be read out simply by operating input device 494 to apply another preselected address signal to modulate the outgoing 25 Hz carrier. In this instance, the address signal is such that upon recovery in target 32' and application to control circuit 490, circuit 490 will operate to address all of the storage locations in NovRam 480 so that upon application of a subsequent write and transfer signal, all of the data stored in NovRam 480 will be transferred to RAM 482 from which it is read out for modulating the 1 mHz subcarrier for transmission to station 20 upon reception of the station's interrogating signal. Alternatively, the addressing scheme may be such to read out just the transient data.

It will be appreciated that the selective read-out of data from preassigned storage locations in NovRam 480 is accomplished by designing control circuit 490 to recognize different address signals from the input device 494 in the interrogating station during the interrogation. In response to these different address signals, control circuit 490 will address different groups of storage locations in NovRam 480, thus providing for the selective read-out and transmission of data stored in NovRam 480. The logic and address circuit design for implementing such a selective read-out is generally conventional, although it will be appreciated that any suitable logic can be readily and quite easily designed for accomplishing the selective read-out.

Because of the selective read-out scheme described above, waybill information or other transient data (such as locomotive maintenance information) can be retained in storage and not read out until desired, even though, in the interim, the identification or other permanent data is read out. Thus, NovRam 480 may be inhibited from reading stored waybill information until the freight car reaches its final destination point, while the identification data is read out and transmitted enroute as the car passes interrogating stations along the car's route to keep track of the whereabouts of the car.

It also will be appreciated that by selectively addressing different storage locations in NovRam 480, new transient data (such as new waybill information) may be selectively written into NovRam 480 at preassigned storage locations without erasing or otherwise disturbing previously stored data (such as the freight car's identification) at other preassigned storage locations. Thus, transient data (such as waybill information) can readily be changed while retaining in storage so-called permanent data (such as the railroad vehicle's identification).

In carrying out the foregoing selective addressing operation, for example, the first 16 NovRam storage locations having say addresses 0 through 15 may be assigned to store the freight car's identification and/or other permanent data, and the remaining storage locations may be assigned to store waybill information and/or other transient data. When a new shipment is placed on the freight, the input device 494 of the transmitter in FIG. 17 is operated to provide a preselected address prefix in the outgoing modulating signal. Control circuit 490 recognizes this address prefix and addresses only those NovRam storage locations having addresses higher than 15 for storing the new waybill information, thus leaving the stored identification undisturbed at addresses 0–15.

While the freight car is in transit, interrogating stations between the car's origin and destination points may be operated to address just the first 16 storage locations in NovRam 480 to read out and thus recall the car's identification at addresses 0–15. Upon reaching the final destination point the entire contents of NovRam 480 may be read out for recall by selectively addressing all of the storage locations in NovRam 480.

Figure 18:
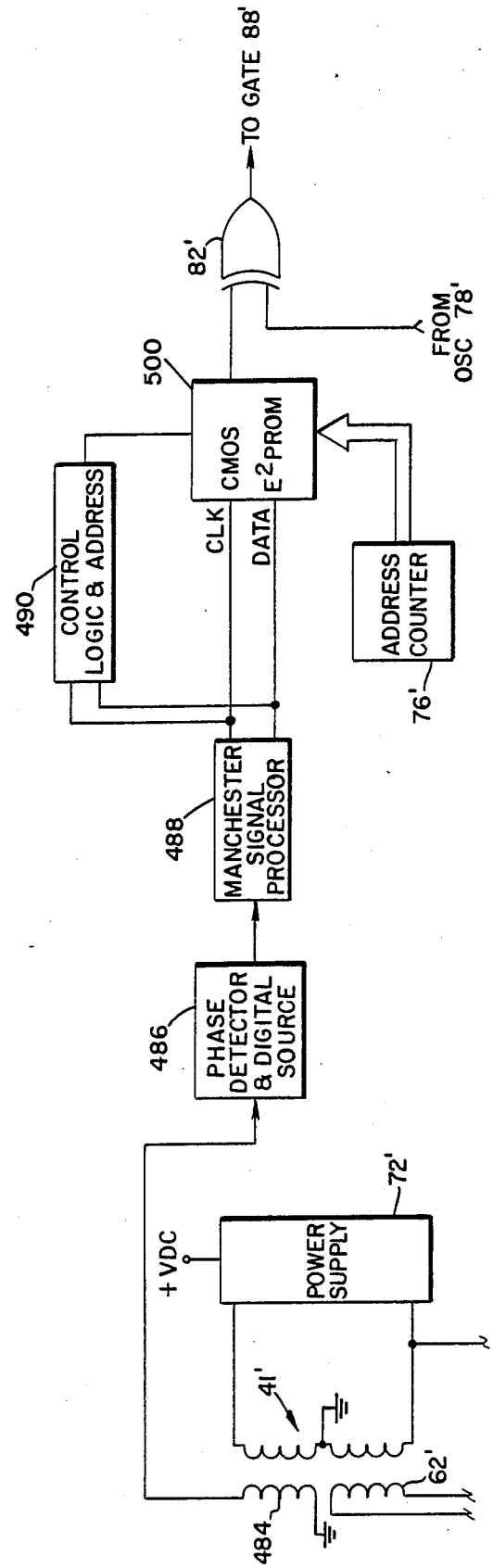
FIG. 18 is a block diagram of a modified form of the target shown in FIG. 16.

The target embodiment shown in FIG. 18 is the same as that illustrated in FIG. 16 except that the NovRam 480 and RAM 482 have been replaced with a single E$^2$PROM memory 500. To the extent that the embodiments of FIGS. 16 and 18 are alike, like reference characters have been applied to designate like components.

Memory 500 nonvolatilely and erasably stores binary data bits and is similar to conventional PROM except that it has a write capability. Memory 500 is clocked directly by the clock output of processor 488 to write in new data at the data output of processor 488. Upon writing new data into memory 500, old data in the memory will be electrically erased. In a write operation, the incoming data appearing at the data output of processor 488 will be prefixed by a suitable write code. Upon recognizing the write code, the control logic will supply the appropriate write signal to memory 500 for enabling the incoming data to be written into and thus stored in memory 500 for later recall. The operation for recalling the data store in memory 500 and for returning it to the interrogating station is the same as that described for the previous embodiments.

Because of the electrically erasable feature of the NovRam 480 in FIG. 16, and the E$^2$PROM memory 500 in FIG. 18, old data is readily erased and replaced by new data, thus enabling new information such as new waybill information for a new shipment to be stored in the target's memory.

Referring back to FIG. 1, available electrical power (such as 120 VAC) along the railroad's right of way may be applied to a system power supply circuit 520 which is used to power interrogating station 20. Advantageously, the system power supply circuit 520 is provided a backup battery 522 which automatically switches in to power station 20 in the event of a main power failure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An interrogator-responder communication system comprising at least one interrogating station adapted to be located along a route taken by vehicles, and at least one passive responder having no power-producing source of its own, said interrogating station comprising (a) means for radiating a power signal to develop a power signal field located along said route and (b) further means for radiating at least one interrogating signal to develop an interrogating signal field located along said route in such a manner that the peak power level of said interrogating signal field lies behind the peak power level of said power signal field as viewed from a preselected direction of vehicle travel along said route, said responder being adapted to be carried by one of the vehicles intended for travel along said route such that said responder passes, in sequence through said power and interrogating signal fields upon travel of the responder-carrying vehicle along said route, said responder having (a) first means for receiving said power signal as the responder passes through said power signal field, (b) second means powered by energy derived from the received power signal for supplying an electrical information-bearing signal, and (c) third means for re-radiating said interrogating signal as the responder passes through said interrogating signal field and for modulating the interrogating signal with said information-bearing signal to provide the re-radiated signal with a modulated signal component, and said interrogating station having receiver means for receiving and demodulating the re-radiation of said interrogating signal.

2. The interrogator-responder communication system defined in claim 1 wherein the field developed by said power signal is a magnetic field, wherein said interrogating signal is an rf signal, and wherein the field developed by said interrogating signal is an electromagnetic field, said interrogating signal having a first preselected frequency and said power signal having a second preselected frequency which is lower than said first preselected frequency.

3. The interrogator-responder communication system defined in clam 1 wherein said vehicles are railroad vehicles, wherein said route is defined by a railroad track, wherein the field developed by said power signal is a magnetic field, wherein the field developed by said interrogating signal is an electromagnetic field, wherein said means for radiating said interrogating signal comprises an antenna, and wherein said means for radiating said power signal comprises a coil, said coil and said antenna lying between the rails of said track and being spaced apart from each other such that said responder first passes over said coil and then over said antenna for a preselected direction of travel along said track.

4. The interrogator-responder communication system defined in claim 1 wherein the means for radiating said interrogating signal comprises an antenna, wherein the power level of said interrogating signal as measured at said antenna is below a predetermined value, wherein the frequency of said power signal lies in a predetermined frequency range below 450 kHz, and wherein said third means of said responder comprises an antenna for reflecting the interrogating signal, the reflections produced by the responder's antenna being the only signal transmitted by said responder.

5. The interrogator-responder communication system defined in claim 1 wherein said interrogating station includes additional means for radiating a further interrogating signal to develop a further interrogating signal field located along said route to provide a field arrangement in which the peak power level of said power signal field lies between the peak power levels of the interrogating signal fields developed by said further means and said additional means so that said responder will pass through one of the interrogating signal fields after it passes through said power signal field regardless of the direction of travel of said vehicle along said route.

6. The interrogator-responder communication system defined in claim 5 wherein said third means of said responder comprises an antenna for reflecting said at least one interrogating signal and said further interrogating signal to return both signals to said interrogating station, wherein said receiver means of said interrogating station comprises a first receiver for receiving the reflection of said at least one interrogating station, a second receiver for receiving the reflection of said further interrogating signal, and means for electrically processing the received reflections of the two interrogating signals to indicate the direction in which the vehicle-carried responder is moving along said route.

7. The interrogator-responder communication system defined in claim 1 wherein said vehicles are railroad vehicles, wherein said route is defined by a railroad track, and wherein said third means of said responder comprises an antenna for reflecting the interrogating signal to effect the re-radiation thereof, and modulating means for modulating the interrogating signal received at said antenna.

8. An interrogator-responder communication system comprising at least one interrogating station adapted to be located along a route taken by vehicles, and at least one passive responder having no power-producing source of its own, said interrogating station comprising (a) means for radiating a power signal to develop a power signal field located along said route and (b) further means for radiating at least one interrogating signal to develop an interrogating signal field located along said route in such a manner that the peak power level of said interrogating signal field lies behind the peak power level of said power signal field as viewed from a preselected direction of vehicle travel along said route, said responder being adapted to be carried by one of the vehicles intended for travel along said route such that said responder passes in sequence through said power and interrogating signal fields upon travel of the responder-carrying vehicle along said route, said responder having (a) first means for receiving said power signals as the responder passes through said power signal field, (b) second means powered by energy derived from the received power signal for supplying an electrical information-bearing signal, and (c) third means for re-radiating said interrogating signal as the responder passes through said interrogating signal field and for modulating the interrogating signal with said information-bearing signal to provide the re-radiated signal with a modulated signal component, and said interrogating station having receiver means for receiving and demodulating the re-radiation of said interrogating signal wherein said second means of said responder comprises an electrical power-consuming circuit, and wherein said responder further includes (a) fourth means for storing energy supplied by the received power signal to power said power-consuming circuit as the responder passes through said interrogating signal field in a region lying beyond the peak of said power signal field, (b) fifth means for sensing the presence of said power signal field as said responder passes through said power signal field, and (c) sixth means responsive to the sensing of said power signal field by said fifth means for preventing said circuit from consuming power as long as said fifth means continues to sense said power signal field.

9. The interrogator-responder communication system defined in claim 8 wherein said power-consuming circuit includes
   (a) an integrated circuit memory for storing the information which is supplied in said information-bearing signal, and
   (b) means for addressing said memory to read out the stored information.

10. An interrogator-responder communication system comprising at least one interrogating station adapted to be located along a route taken by vehicles, and at least one passive responder having no power-producing source of its own, said interrogating station comprising (a) means for radiating a power signal to develop a power signal field located along said route and (b) further means for radiating at least one interrogating signal to develop an interrogating signal field located along said route in such a manner that the peak power level of said interrogating signal field lies behind the peak power level of said power signal field as viewed from a preselected direction of vehicle travel along said route, said responder being adapted to be carried by one of the vehicles intended for travel along said route such that said responder passes in sequence through said power and interrogating signal fields upon travel of the responder-carrying vehicle along said route, said responder having (a) first means for receiving said power signals as the responder passes through said power signal field, (b) second means powered by energy derived from the received power signal for supplying an electrical information-bearing signal, and (c) third means for re-radiating said interrogating signal as the responder passes through said interrogating signal field and for modulating the interrogating signal with said information-bearing signal to provide the re-radiated signal with a modulated signal component, and said interrogating station having receiver means for receiving and demodulating the re-radiation of said interrogating signal wherein said power and interrogating signal fields are spaced apart about a preselected db power level, wherein said second means for said responder comprises a power-consuming circuit, and wherein said responder further includes (a) means for electrically storing energy supplied by the received power signal, and (b) means for preventing said power-consuming circuit from consuming the stored energy as long as said responder is in the power signal field.

11. An interrogator-responder communication system comprising at least one interrogating station adapted to be located along a route taken by vehicles and having means for radiating a pair of first rf signals for developing a corresponding number of signal fields having their peak power levels spaced apart along said route, and at least one signal responder, said responder being adapted to be carried by one of the vehicles intended for travel along said route such that said responder passes seriatium through said fields upon travel of the responder-carrying vehicle along said route, said responder comprising means for returning an information-bearing signal to said station for reception thereby as the responder passes through one of said fields, but not the other.

12. The interrogator-responder communication system defined in claim 11 wherein said station further includes means for electrically processing the received information-bearing signal to provide an indication of the direction in which the responder-carrying vehicle is travelling along said route, and wherein said means for returning said information-bearing signal comprises an antenna for reflecting said first signals, and means for modulating only one of the first signals with said information-bearing signal as said responder passes through the field developed by said one of said first signals to provide the reflection of said one of said first signals with a modulating signal component.

13. An interrogator-responder communication system comprising at least one interrogating station adapted to be located along a route taken by vehicles, and at least one responder, said interrogating station comprising means for radiating a pair of first signals to develop a corresponding number of signal fields having their peak power levels spaced apart along said route, said responder being adapted to be carried by one of the vehicles intended for travel along said route so that said responder passes seriatium through fields as the responder-carrying vehicle travels in either direction along said route, said responder having (a) means for re-radiating said first signals and (b) means operated by said interrogating station for modulating one of said first signals with a data-bearing signal as the responder passes through the trailing one of said fields, but not the leading one of said fields as viewed from the direction of vehicle travel along said route and regardless of the direction in which the vehicle is travelling along said route, and said interrogating station having means for receiving the re-radiation of said first signals.

14. The interrogator-responder communication system defined in claim 13 wherein said vehicles are railroad vehicles, wherein said route is defined by a railroad track, and wherein said means of said responder for re-radiating said first signals comprises a signal-reflecting antenna.

15. The interrogator-responder communication system defined in claim 14 wherein said first signals are rf signals having a common frequency.

16. In a communication system, at least one station adapted to be stationarily located along said route taken by vehicles and comprising transmitter means for radiating an rf signal to develop an electromagnetic signal field along said route such that each vehicle reflects said signal as it passes through said field, further means for receiving the vehicle-produced reflection of said signal, means for electrically processing the received vehicle-produced reflection of said signal for signalling the presence of the vehicle, the improvement comprising, a plurality of signal responders each adapted to be carried by a different one of the vehicle's intended for travel along said route, and each of said responders having means for reflecting said rf signal as it passes through said field and for modulating the reflected signal with an information-bearing signal, said further means of said interrogating station being situated to receive the responder-produced reflection of said rf signal in addition to the vehicle-produced reflection of said rf signal.

17. In an interrogator-responder communication system, at least one stationary interrogating station adapted to be located along a route taken by vehicles and having means for radiating at least one rf signal to develop a signal field along said route and a plurality of responders each adapted to be carried by a different vehicle intended for travel along said route, each of said responders being operated by said station to return an information-bearing signal to said station for reception thereby as it passes through said field, and said interrogating station comprising means for sensing and signalling the passage of each vehicle through said field regardless of whether the sensed vehicle is carrying one of said responders or not.

18. The interrogator-responder communication system defined in claim 17 wherein said vehicles are railroad vehicles, wherein said route is defined by a railroad track, wherein each responder has means for reflecting the rf signal and for modulating it with the information-bearing signal such that the information-bearing signal is returned to the interrogating station as a modulating signal component of the reflected rf signal, wherein said sensing and signalling means of said interrogating station comprises a circuit which senses a reflection of the rf signal by each vehicle, and wherein said circuit forms a part of a receiver which receives both the vehicle-produced reflection and the responder-produced reflections of said rf signal.

19. In an interrogator-responder communication system comprising at least one interrogating station adapted to be located along a route taken by vehicles, and at least one signal responder adapted to be carried by one of the vehicles intended for travel along said route, said interrogating station comprising means for radiating at least one signal to develop a signal field along said route, said responder having signal-producing means operated by said station for producing a data-bearing signal and means for supplying the data-bearing signal to said station for reception thereby as the responder passes through said field, there being cooperating means in said responder and said station for enabling said station to sense and signal the passage of the responder through said field, the improvement comprising, wherein said station comprises means for electrically processing the data-bearing signal supplied by said responder to recover the data in said data-bearing signal, wherein said cooperating means comprises a signal-sensing circuit in said interrogation station for producing a first signal to indicate the passage of the responder through said field even through said signal producing means fails to produce said information bearing signal, means responsive to the failure of said electrical processing means to recover data for producing a second signal, and means responsive to the concomitant occurrence of said first and second signals for producing a third signal which indicates that the responder passing through said field is defective.

20. An interrogator-responder communication system comprising at least one interrogating station adapted to be located along a route taken by vehicles, and at least one signal responder adapted to be carried by one of the vehicles intended for travel along said route, said responder having antenna means providing for the transmission of an rf signal, first means operated by said station to supply a data signal containing preselected data, second means for supplying a further signal having a preselected characteristic even though said first means fails to supply said data signal, and third means for modulating said rf signal with said data signal and said further signal, said interrogating station having means for receiving and demodulating said rf signal to recover said data signal and said further signal, and means for sensing and signalling a condition in which said further signal is recovered but not the data signal to indicate that the responder is defective.

21. The interrogator-responder communication system defined in claim 20 wherein said station has means for radiating said rf signal, wherein said antenna means reflects the transmitted rf signal such that the transmission of said rf signal from said responder is accomplished by reflecting the rf signal, wherein said first means of said responder includes an integrated circuit memory for storing said data and a circuit for reading out the stored data to produce said data signal.

22. The interrogator-responder communication system defined in claim 20 wherein said interrogating signal comprises means for radiating said further signal, wherein said second means of said responder comprises means for receiving said further signal and means for conducting the received further signal to said third means for modulating the rf signal independently of said first means, said responder being of the passive type having no power-producing source of its own and being powered by the energy derived from said further signal.

23. An interrogator-responder communication system comprising at least one interrogating station adapted to be located along a route taken by vehicles, and a plurality of signal responders, each of said responders being adapted to be carried by a different one of the vehicles intended for travel along said route such that at least some, but not necessarily all of the vehicles travelling along said route carries one of said responders, each of said responders being interrogated by said station to return a data-bearing signal to said station for reception thereby as the vehicle-carried responder passes a given location along said route, and said interrogating station having means for (a) sensing and signalling the presence of each vehicle passing said location regardless of whether the passing vehicle is carrying one of the responders or not, (b) sensing and signalling the presence of each vehicle-carried responder which is operational to supply the data for the information-bearing signal as the responder passes said location to indicate that the passing responder is operational, and (c) sensing and signalling the presence of each responder which passes said location, but which is inoperative to supply said data to indicate that the passing responder is defective.

24. The interrogator-responder communication system defined in claim 23 wherein said station including signal responsive means for producing a list in digital signal format wherein said list contains an item for each railroad vehicle passing said location, and wherein each item indicates the absence of a responder on the passing vehicle where the vehicle is not carrying one of said responders and, in the case where the vehicle is carrying one of said responders, whether or not the vehicle-carried responder was operative to return its data to said station upon being interrogated by said station.

25. The interrogator-responder communications system defined in claim 23 wherein each responder as means for transmitting an rf signal means for modulating the rf signal with said data-bearing signal, and means for modulating said rf signal with a further signal even under conditions where the responder is inoperative to provide the data for modulation of the rf signal, wherein said interrogating station has a receiver for receiving the rf signal, and wherein said means in said station comprises a first circuit for producing a separate signal for each vehicle passing said location regardless of whether the vehicle is carrying one of said responders or not, second circuit for producing a separate signal for each passing responder which is operative to modulate the rf signal with its data-bearing signal and its further signal, and a third circuit for producing a separate signal for each passing responder which is operative to modulate the rf signal with it further signal but not its data-bearing signal.

26. The interrogator-responder communication system defined in claim 25 wherein said vehicles are railroad vehicles, wherein said route is a railroad track, and wherein said means in said station further comprises an electrical signal processing circuit responsive to the separate signals produced by said first, second and third circuits for producing a list in digital signal format, wherein the list contains a separate item for each passing vehicle for indicating the absence of a responder on the passing vehicle where the vehicle is not carrying one of said responders, the presence of an operational responder on the passing vehicle where one of the responders is carried on the vehicle and is operative to modulate the rf signal with its data, and the presence of a defective responder on the passing vehicle where one of the responders is carried on the vehicle but fails to modulate the rf signal with its data.

27. The interrogator-responder communication system defined in claim 26 wherein said station includes a transmitter for radiating an interrogating signal to develop a signal field along said railroad track at said location such that each railroad vehicle and each of the vehicle-carried responders pass through said field, and wherein said responder has means for reflecting said interrogating signal, said rf signal being the reflection of said interrogating signal.

28. In an interrogator-responder communication system comprising at least one interrogating station adapted to be located along a route taken by vehicles and at least one signal responder adapted to be carried by one of the vehicles intended for travel along said route, said station having a circuit for transmitting at least one signal to and for receiving at least one signal from said responder, said responder being operated by said station to return an information-bearing signal to said station for reception thereby, and selectively actuatable testing means at said station for testing at least a portion of said circuit to determined whether or not said portion is in working order and wherein said station includes means for sensing the presence of a passing vehicle, and means for inhibiting selective actuation of said testing means in response to the sensing of a vehicle by said sensing means.

29. The interrogator-responder communication system defined in claim 28 wherein said interrogating station is connected by at least one communication link to a remote station, and wherein said testing means is selectively actuatable by a signal originating from said remote station and transmitted over said communication link to said interrogating station.

30. The interrogator-responder communication system defined in claim 29 wherein there are a plurality of said interrogating stations connected by said at least one communication link to said remote station actuates each said selectively actuable testing means at each said station to test the operability thereof and communicate the results to said remote station.

31. The interrogator-responder communication system defined in claim 28 wherein said testing means comprises a signal-producing circuit for simulating a signal produced by said responder.

32. The interrogator-responder communication system defined in claim 28 wherein said vehicles are railroad vehicles, and wherein said route is defined by a railroad track.

33. The interrogator-responder communication system defined in claim 28 wherein the signal transmitted by said circuit is an rf signal, wherein said circuit has a transmitter for radiating said rf signal to develop a signal field along said route such that vehicles travelling along said route pass through said field, wherein said responder has means for reflecting said rf signal as the vehicle-carried responder passes through said field and means for modulating the rf signal with a data-bearing signal to provide the reflection of said rf signal with modulating signal component, wherein said circuit of said interrogating station includes a receiver for receiving and demodulating the modulated reflection of said rf signal to recover the data-bearing signal, wherein said testing means comprises signal-generating circuit means for producing a coded signal which simulates said data-bearing signal and which represents a preselected code, said signal generating circuit means being electrically connected to said transmitter to modulate said rf signal with said coded signal to provide for the radiation of the modulated rf signal, and said receiver having an antenna situated to receive the modulated rf signal such that the modulated rf signal is received and demodulated by said receiver to recover the coded signal, and the recovery of the coded signal by said receiver providing an indication that the transmitter and receiver are in working order.

34. A communication system comprising first and second units, one of said unit being adapted to be carried by a vehicle from movement relative to the other of said units, said first unit comprising means for generating a subcarrier signal of preselected frequency, means for producing a digital data signal representing data in binary form and having a binary it rate equal to a submultiple of the frequency of said subcarrier signal, means for modulating the subcarrier signal with said digital data signal, means for modulating an rf signal with the modulated subcarrier signal, and antenna means for transmitting the modulated rf signal, said second unit having means for receiving the modulated rf signal, and means for recovering the digital data signal from the modulated rf signal.

35. The communication system defined in claim 34 wherein said means for generating said subcarrier signal comprises an oscillator which operates asynchronously with respect to any signals transmitted by said second unit.

36. The communication system defined in claim 34 wherein said second unit is an interrogating station adapted to be located along a route taken by vehicles, wherein said first unit is adapted to be carried by one of said vehicles for movement past said station as the vehicle travels along said route, wherein said interrogating station comprises means for radiating an interrogating signal to develop a signal field along said route, and wherein the rf signal transmitted by said antenna means of said first unit is a reflection of said interrogating signal, which reflection occurs as the first unit travels through said field.

37. The communication system defined in claim 34 wherein said second unit comprises means for generating a clock signal from the recovered digital data signal.

38. The communication system defined in claim 37 wherein said digital data signal is a bi-phase signal having a bit rate equal to a submultiple of the frequency of said subcarrier signal.

39. A communication system comprising first and second units, one of said units being adapted to be carried by a vehicle for movement relative to the other of said units, said first unit comprising (a) integrated circuit memory means for storing data in binary bit form, (b) means for producing a subcarrier signal of preselected frequency, (c) means for frequency dividing said subcarrier signal to produce a first clock signal having a pulse repetition frequency that is a submultiple of the frequency of said subcarrier, (d) means operated by said clock signal for reading out the data stored in said memory means at a bit rate set by said first clock signal to provide an NRZ digital data signal, (e) means for converting said NRZ digital signal into a bi-phase digital signal having a bit rate set by said first clock signal, (f) means for modulating said subcarrier signal with said bi-phase digital signal, (g) means for modulating an rf signal with the modulated oscillator signal, and (h) antenna means for transmitting the modulated rf signal, said second unit comprising (a) first means for receiving the modulated rf signal, and for demodulating the received rf signal to recover the modulated subcarrier signal, and (b) second means for electrically processing the recovered subcarrier signal to reproduce said bi-phase signal and said NRZ signal and to generate a second clock signal from the recovered bi-phase signal.

40. The communication system defined in claim 39 wherein said second means of said second unit comprises a first circuit for producing a time reference signal slaved to and having the same frequency as the recovered subcarrier signal, a second circuit controlled by said time reference signal for recovering said bi-phase signal from the modulated subcarrier signal which is recovered by said first means, a third circuit for generating said second clock signal from the recovered bi-phase signal in such a manner that the bit rate of the second clock signal is slaved to the bit rate of the recovered bi-phase signal, and a fourth circuit clocked b said second clock signal for reproducing said NRZ digital signal from the recovered bi-phase signal.

41. The communication system defined in claim 39 wherein said second unit is an interrogating station situated along a route taken by vehicles, wherein said first unit is adapted to be carried by one of said vehicles, wherein said interrogating stating comprises means for radiating an rf interrogating signal to develop a signal field along said route, and wherein the rf signal transmitted by said antenna means of said first unit is a reflection of said interrogating signal, which reflection occurs as the first unit travels through said field.

42. An interrogator-responder communication system comprising at least one interrogating station adapted to be located along a route taken by vehicles, and at least one signal responder adapted to be carried by one of the vehicles intended for travel along said route, said responder comprising oscillator means operating asynchronously of any signals transmitted by said station for producing an oscillator signal of preselected frequency, means for producing a digital data signal representing data in binary form and having a preselected bit rate, means for modulating the oscillator signal with said digital data signal, means for modulating an rf signal with the modulated oscillator signal, and antenna means for transmitting the modulated rf signal, said interrogating station having means for receiving the modulated rf signal as the responder-mounted vehicle travels past a given location along said route, means for recovering the digital data signal from the modulated rf signal, and means for generating a clock signal which is slaved to the bit rate of the recovered digital signal.

43. An interrogator-responder communication system comprising at least one interrogating station adapted to be located along a route taken by vehicles, and at least one signal responder adapted to be carried by one of the vehicles intended for travel along said route, said station having means for radiating at least one rf signal to develop a signal field along said route such that the vehicle-mounted responder passes through said field upon travel of the vehicle along said route, said responder having means for reflecting said signal as it passes through said filed, and said station having (a) means for receiving the reflection of said rf signal, and (b) means for decreasing the power level of the radiated rf signal as the power level of the received reflection increases.

44. In a responder adapted to be carried on a vehicle intended for travel along a certain route for establishing radio communication with a station situated along said route, integrated circuit memory means for storing data in binary bit form, oscillator means operating asynchronously of any signals transmitted by said station for producing an oscillator signal of preselected frequency, means for frequency dividing said oscillator signal to produce a clock signal having a pulse repetition frequency that is a submultiple of the frequency of said oscillator signal, means operated by said clock signal for reading out the data stored in said memory means at a bit rate set by said clock signal to provide an NRZ digital data signal, means for converting said NRZ digital signal into a bi-phase signal having a bit rate set by said clock signal, means for modulating said oscillator signal with said bi-phase signal, means for modulating an rf signal with the modulated oscillator signal.

45. An interrogator-responder communication system comprising at least one interrogator unit and at least one responder unit, one of said units being adapted to be carried by a vehicle for movement relative to the other of said units, said responder unit being operated by said interrogator unit to transmit a signal to said interrogator unit for reception thereby, said interrogator unit having an exciter coil for supplying power to said responder unit and a source for conducting current through the exciter coil, said responder unit having a receive coil adapted to magnetically couple with the exciter coil for receiving operating power, and said interrogator unit further including means for sensing an interruption or decrease in the level of current conducted through said exciter coil, and means for developing a further signal in response to the sensing of said interruption or said decrease by said sensing mean for signalling the occurrence of said interruption or decrease.

46. The interrogator-responder communication system defined in claim 45 wherein said interrogator unit further comprises a circuit for transmitting rf signals to and receiving rf signals from said responder unit, selectively actuatable testing means for testing at least a portion of said circuit, and means for inhibiting operation of said testing means in the response to the occurrence of said further signal.

47. In an identification system wherein a plurality of objects to be identified are moved through a plurality of interrogation stations at various times, respectively, each said object having an identification device moved therewith through each said interrogation station, each said identification device having:
  (1) an electronic memory for storing a data code unique to the object carrying said identification device, respectively,
  (2) a reflecting antenna,
  (3) means to modulate the impedance of said reflecting antenna in accordance with the data code stored in said electronic memory,
  the improvement comprising,
  (4) means for converting said data code from said electronic memory to a self-clocking data code signal,
  (5) means for impressing said self-clocking data code onto a carrier signal, and
  (6) means for coupling a modulated carrier signal to said (3) means to modulate the impedance of said reflecting antenna.

48. An interrogator-responder communication system comprising at least one interrogator unit and at least one responder unit, said interrogator unit comprising means for transmitting an rf signal, said responder unit having means for reflecting said rf signal and for providing the reflected signal With a modulating, data-bearing digital signal component, said interrogating unit having means for receiving the reflected signal and means for demodulating the received, reflected signal to recover said digital signal component, one of said units being adapted to be carried by a vehicle for movement relative to the other of said units such that in the course of the movement of said responder unit relative to said interrogating unit the responder unit passes through two or more quarter wavelength fields of the rf signal which is transmitted by said interrogating unit, said demodulating means have the capability of inverting the recovered data-bearing digital signal component due to the relative movement of the responder unit through said quarter wavelength fields, and a circuit having a data output and comprising sensing means for sensing the inversion of the recovered digital signal component, and further means responsive to the sensing of said inversion by said sensing means for supplying the recovered digital signal component to said data output in re-inverted form, whereby the phase of the recovered digital signal component will be correct at said data output.

49. The interrogator-responder communication system defined in claim 48 wherein said responder unit is carried by said vehicle, wherein said interrogator unit is stationarily situated along a route taken by said vehicle, wherein said responder unit provides said digital signal component with a preselected bit code with prefixes the data bits in the digital signal component, and wherein said sensing means senses whether said code is in its non-inverted state or its inverted state, wherein said further means is effective to re-invert the recovered digital signal component if said sensing means senses that said code is in its inverted state, and wherein said circuit includes still further means for passing the recovered digital signal component to said data output without inverting it if said sensing means senses that said code is in its non-inverted state.

50. A communication system comprising an interrogating station adapted to be located along a route taken by vehicles for use with at least one signal responder which is carried by one of the vehicles intended for travel along said route where said responder is operated by said station to return a modulated rf signal having a data-representing digital signal component, said station comprising means for receiving said rf signal and for recovering said digital signal component from the received rf signal, and means for generating a digital clock signal from the recovered digital signal component, which clock signal is slaved to the bit rate of the recovered digital signal component.

51. An interrogator-responder communication system comprising at least one interrogating station adapted to be located along a route taken by vehicles, and at least one signal responder adapted to be carried by one of the vehicles intended for travel along said route, said station having means for transmitting at least one signal to said responder, and said responder having means operated by the interrogating station for transmitting a signal to said station for reception thereby, wherein each signal transmitted by said station and said responder has an intensity level below 50 microvolts per meter as measured at 30 meters from its transmit antenna.

52. An interrogator-responder communication system comprising at least one interrogating station adapted to be located along a route taken by vehicles, and at least one passive responder having no power producing source of its own and adapted t be carried by one of the vehicles intended for travel along said route, said responder comprising (a) a non-volatile electrically erasable, programmable integrated circuit memory, (b) means for receiving a first data-bearing signal containing selected data, means for recovering the data from the received data-bearing signal and means for storing the recovered data into said memory and electrically erasing any old data in the memory at the locations where the new data is stored, and (c) means operated by said station for recalling the stored data and providing for the transmission of the recalled data back to said station in the form of a second data-bearing signal, and said station having means for receiving the second data-bearing signal.

53. The interrogator-responder communication system defined in claim 52 wherein said vehicles are railroad vehicles and wherein said route is defined by a railroad track.

54. The interrogator-responder communication system defined in claim 52 wherein said memory comprises a NovRam.

55. The interrogator-responder communication system defined in claim 52 wherein said memory comprises an $E^2PROM$.

56. The interrogator-responder communication system defined in claim 52 wherein said first signal is prefixed with a selected code, and wherein said means for storing the data in said memory includes a circuit for recognizing said code and for placing said memory in a write mode to store the incoming data upon recognizing said code.

57. The interrogator-responder communication system defined in claim 52 wherein said station comprises means for radiating an rf signal to develop a signal field along said route such that the vehicle-mounted responder passes through said field upon travel of the vehicle along said route, said responder having antenna means for reflecting said rf signal as it passes through said field, means for encoding said second data-bearing signal with a clock signal, and means for modulating the rf signal received at said antenna means with said second data-bearing signal encoded with a clock signal such that said second data-bearing signal is transmitted to said station in the form of a modulating signal component, said receiving means at said station providing for the reception and demodulation of the reflected rf signal to recover the second data-bearing signal and the clock signal therein, and means for electrically processing said second signal with said clock signal upon its recovery for retrieving the recalled data in digital signal format.

58. A passive responder having no power producing source of its own and adapted to be carried on a vehicle intended for travel along a route for establishing radio communication with a station situated along said route, said passive recorder comprising (a) an electrically erasable, read/write integrated circuit memory, (b) means for receiving a first data-bearing signal containing selected data, means for recovering the data from the received data-bearing signal and storing the recovered data in said memory and electrically erasing any old data in the memory at the locations where the new data is stored, (c) means for recalling the stored data, (d) means for transmitting the encoded recalled data back to said station in the form of a self-clocking second data-bearing signal.

59. The passive responder defined in claim 58 wherein said vehicles are railroad vehicles and wherein said route is defined by a railroad track.

60. The passive responder defined in claim 58 wherein said memory comprises a NovRam.

61. The passive responder defined in claim 58 wherein said memory comprises an $E^2PROM$.

62. The passive responder defined in claim 58 wherein said first signal comprises a periodic signal modulated with a signal component containing said data, wherein said means for recovering the incoming data from the first signal upon its reception by the responder comprises a demodulator for demodulating the periodic signal, and wherein said responder further comprises a d.c. power supply circuit which derives power from said periodic signal to supply the responder's operating power.

63. A passive responder having no power producing source of its own and adapted to be carried on a vehicle intended for travel along a certain route for establishing radio communication with a station situated along said route, said passive responder comprising circuit means for supplying a data-bearing signal for transmission to and reception by said station as the responder-carrying vehicle passes a given location along said route, a receive coil adapted to inductively couple with said power supply coil at said station for receiving power from said magnetic signal and to provide the operating power for said circuit means, and means electrically connected to said receive coil for limiting the voltage excursion across said receive coil.

64. A communication responder adapted to be operated by an interrogating station and comprising a non-volatile random access read/write memory having a multiplicity of data storage locations each represented by a different address, first means for receiving a signal having a data signal component and a selected address signal component and for recovering the data and address components from said signal, second means for storing the recovered data in said memory at just those addresses determined by said address component, said first means being effective to receive a further signal having a read signal component and a further address signal component and to recover said read component and said further address component from said further signal, and said second means being responsive to said read component and said further address component for reading out the data stored in said memory at just those addresses determined by said further address component, and means providing for the transmission of the read-out data, said address components being selected to provide for the write-in of data just at selected addresses in said memory and the read-out of data stored just at selected addresses in said memory.

65. A communication responder adapted to be operated by an interrogating station and comprising memory means for storing first data in binary form, means for reading out the data stored in said memory means, means for monitoring an external parameter to produce second data, means for serially transmitting said first and second data without storing second data in said memory means, and means for inhibiting the simultaneous transmission of said first and second data.

66. An interrogator-responder communication system comprising at least one interrogating station adapted to be located along a railroad track taken by railroad vehicles, and at least one passive responder having no power-producing source of its own, said interrogating station comprising (a) means for radiating a power signal to develop a power signal field located along said track and (b) further means for radiating at least one interrogating signal to develop an interrogating signal field located along said track, said responder being adapted to be carried by one of the railroad vehicles intended for travel along said track such that said responder passes through said power and interrogating signal fields upon travel of the responder-carrying vehicle along said track, said responder having (a) first means for receiving said power signal as the responder passes through said power signal field, (b) second means powered by energy derived from the received power signal for supplying an electrical information-bearing signal, and (c) third means for re-radiating said interrogating signal as the responder passes through said interrogating signal field and for modulating the interrogating signal with said information-bearing signal to provide the re-radiated signal with a modulating signal component, and said interrogating station having receiver means for receiving and demodulating the re-radiation of said interrogating signal, said means for radiating said interrogating signal comprising a first element, said means for radiating said power signal comprising a second element, and said first and second elements lying between the rails of said track.

67. A method for conveying data by a vehicle which is intended for travel along one or more routes and which is equipped with or carries a responder having a non-volatile, electrically erasable read/write integrated circuit memory for storing data in binary bit form, said method comprising the steps of supplying selected data to said responder and writing the supplied data into said memory at a first place along one of said routes to electrically store the data in said memory, thereafter moving said vehicle along one or more of said routes to a second place remote from said first place, operating said responder at said second place to recall the data stored in said memory, thereafter changing the data stored in said memory at a selected place by supplying new data to said responder and writing the new data into said memory as well as electrically erasing at least a portion of the old data in the memory, thereafter moving the vehicle along one or more of the routes to a further place, and operating the responder at said further place to recall the data then stored in said memory.

68. The method defined in claim 67 wherein said vehicle is a freight-transporting railroad vehicle, wherein said routes are railroad tracks, wherein the data written into the memory comprising waybill information which pertains to the particular shipment being hauled by said railroad vehicle at the time, and wherein waybill information written into the memory is changed each time a new shipment is placed on the railroad vehicle so that the stored waybill information corresponds to the shipment being hauled by the railroad vehicle.

69. The method defined in claim 68 wherein the waybill information is supplied to said responder by incorporating it into a data-bearing signal and by transmitting the data-bearing signal through space for reception by the responder.

70. A method for conveying data by a vehicle which is intended for travel along one or more routes and which is equipped with or carries a responder having a random access read/write sensory containing a multiplicity of data storage locations each represented by a different address, said method comprising the steps of storing first data in said memory at at least one selected, known address, storing second data in said memory at another selected, know address, thereafter moving said vehicle along one or more of said routes to a preselected place, transmitting a first signal to said responder while said vehicle is enroute to said place to recall just said first data but not said second data from said memory and transmitting the recalled data to a station along one of the routes taken by the vehicle, thereafter transmitting a second signal to said responder upon arrival of the vehicle at said place to recall said second data, and transmitting the recalled second data to a further station.

71. The method defined in claim 70 wherein said vehicle is a railroad vehicle, and wherein said routes are railroad tracks, the steps of addressing said memory to store new data in said memory in place of said second data after said second data has been recalled and without erasing said first data, thereafter moving the railroad vehicle along one or more of said routes to a further place, recalling the new data from the memory at said further place, and transmitting the recalled new data to a station.

* * * * *